US011812906B2

(12) United States Patent
Scholten et al.

(10) Patent No.: US 11,812,906 B2
(45) Date of Patent: Nov. 14, 2023

(54) APPARATUS FOR CLEANING A SURFACE

(71) Applicant: BISSELL Inc., Grand Rapids, MI (US)

(72) Inventors: Jeffrey A Scholten, Ada, MI (US); Jacob Resch, Grand Rapids, MI (US); Jacob S. Boles, Grand Rapids, MI (US); Bryan Lee Villaroman, Grand Rapids, MI (US); Victoria J. Royale, Charlotte, MI (US); Timothy R. Lambrix, West Olive, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 17/959,397

(22) Filed: Oct. 4, 2022

(65) Prior Publication Data

US 2023/0023900 A1 Jan. 26, 2023

Related U.S. Application Data

(63) Continuation of application No. 17/252,596, filed as application No. PCT/US2019/038383 on Jun. 21, 2019, now Pat. No. 11,490,774.

(Continued)

(51) Int. Cl.
*A47L 11/34* (2006.01)
*A47L 11/40* (2006.01)
*G01F 23/80* (2022.01)

(52) U.S. Cl.
CPC ........... *A47L 11/34* (2013.01); *A47L 11/4008* (2013.01); *A47L 11/4011* (2013.01);
(Continued)

(58) Field of Classification Search
CPC ........ A47L 11/30; A47L 11/34; A47L 11/201; A47L 11/4008; A47L 11/4011;
(Continued)

(56) References Cited

U.S. PATENT DOCUMENTS

| 4,367,462 A | 4/1983 | Dressler |
| 4,733,560 A | 3/1988 | Dam |

(Continued)

FOREIGN PATENT DOCUMENTS

| CN | 111380590 A | 7/2020 |
| DE | 202017107509 U1 | 3/2018 |

(Continued)

OTHER PUBLICATIONS

Burke Davison, mTouch Sensing Solution Acquisition Methods Capacitive Voltage Divider, 2013 Microchip Technology, 28 pages.
(Continued)

*Primary Examiner* — Brian D Keller
*Assistant Examiner* — Tim Brady
(74) *Attorney, Agent, or Firm* — WARNER NORCROSS + JUDD LLP

(57) ABSTRACT

An apparatus for cleaning a surface includes a liquid delivery system for storing cleaning liquid and delivering the cleaning liquid to the surface to be cleaned, a fluid recovery system and a control system. The control system includes a controller that is coupled to a sensing assembly. Methods of operating the same include sensing foam or liquid with the sensing assembly.

20 Claims, 21 Drawing Sheets

Related U.S. Application Data

(60) Provisional application No. 62/789,661, filed on Jan. 8, 2019, provisional application No. 62/688,428, filed on Jun. 22, 2018.

(52) U.S. Cl.
CPC ....... *A47L 11/4019* (2013.01); *A47L 11/4083* (2013.01); *G01F 23/80* (2022.01)

(58) Field of Classification Search
CPC .. A47L 11/4019; A47L 11/4083; A47L 11/40; A47L 11/4002; A47L 11/4013; A47L 11/4016; A47L 11/408; A47L 9/28; A47L 9/2805; A47L 7/00; A47L 7/0004; A47L 7/0023; A47L 7/0028; G01F 23/0061; G01F 23/241; G01F 23/24; G01F 23/26–265; G01F 23/284; G01F 23/245; G08B 21/182; G08B 21/18; G08B 21/20; G08B 23/00
USPC .......................................... 15/320, 302, 339
See application file for complete search history.

(56) References Cited

U.S. PATENT DOCUMENTS

| | | | |
|---|---|---|---|
| 4,880,982 A | 11/1989 | Hoksaas | |
| 4,912,976 A | 4/1990 | Labriola, II | |
| 5,075,863 A | 12/1991 | Nagamune et al. | |
| 5,148,177 A | 9/1992 | Nagamune et al. | |
| 5,600,997 A | 2/1997 | Kemp et al. | |
| 5,719,556 A | 2/1998 | Albin et al. | |
| 5,920,955 A | 7/1999 | Berfield | |
| 6,078,729 A | 6/2000 | Kopel | |
| 6,812,847 B1 | 11/2004 | Salem | |
| 6,832,407 B2 | 12/2004 | Salem et al. | |
| 7,275,430 B2 | 10/2007 | Zuleta et al. | |
| 7,629,800 B2 | 12/2009 | Parachini et al. | |
| 7,891,243 B2 | 2/2011 | Winkens | |
| 8,516,650 B2 | 8/2013 | Beers | |
| 8,931,340 B2* | 1/2015 | Wiederkind-Klein | G01F 23/268 73/304 C |
| 9,701,128 B2 | 7/2017 | Arpin | |
| 9,930,980 B2* | 4/2018 | Pau | A47G 23/16 |
| 2002/0042965 A1* | 4/2002 | Salem | A47L 11/4044 15/339 |
| 2004/0173021 A1* | 9/2004 | Lizon | G01F 23/2967 73/290 V |
| 2006/0102206 A1* | 5/2006 | Wood | A47L 11/03 134/184 |
| 2007/0165488 A1 | 7/2007 | Wildey | |
| 2009/0089957 A1* | 4/2009 | Lenkiewicz | A47L 11/4088 15/320 |
| 2010/0162818 A1 | 7/2010 | David et al. | |
| 2012/0260729 A1 | 10/2012 | Bayley et al. | |
| 2017/0049288 A1* | 2/2017 | Knutson | A47L 11/4083 |
| 2017/0059389 A1* | 3/2017 | Moore | G08C 17/00 |
| 2017/0075363 A1* | 3/2017 | Steinke | F04D 13/08 |
| 2017/0156540 A1* | 6/2017 | Wheatley | B67D 1/0871 |
| 2018/0168419 A1 | 6/2018 | Johnson et al. | |
| 2019/0133398 A1* | 5/2019 | Chavana, Jr. | A47L 11/201 |

FOREIGN PATENT DOCUMENTS

| | | |
|---|---|---|
| JP | 2002202177 A | 7/2002 |
| JP | 2009295329 A | 12/2009 |
| JP | 2010029600 A | 2/2010 |
| JP | 2013104755 A | 5/2013 |
| KR | 101605531 B1 | 3/2016 |

OTHER PUBLICATIONS

Tom at Department of Physics, University of Illinois. "Q&A: Bubbles and static electricity" (Oct. 22, 2007). https:// van.physics.illinois.edu/qa/listing.php?id=540&5=bubbles-and-static-electricity (Year: 2007).

Barr, Michael. "Introduction to Pulse Width Modulation" (Aug. 31, 2001). https://www.embedded.com/ introduction-to-pulse width-modulation (Year: 2001).

\* cited by examiner

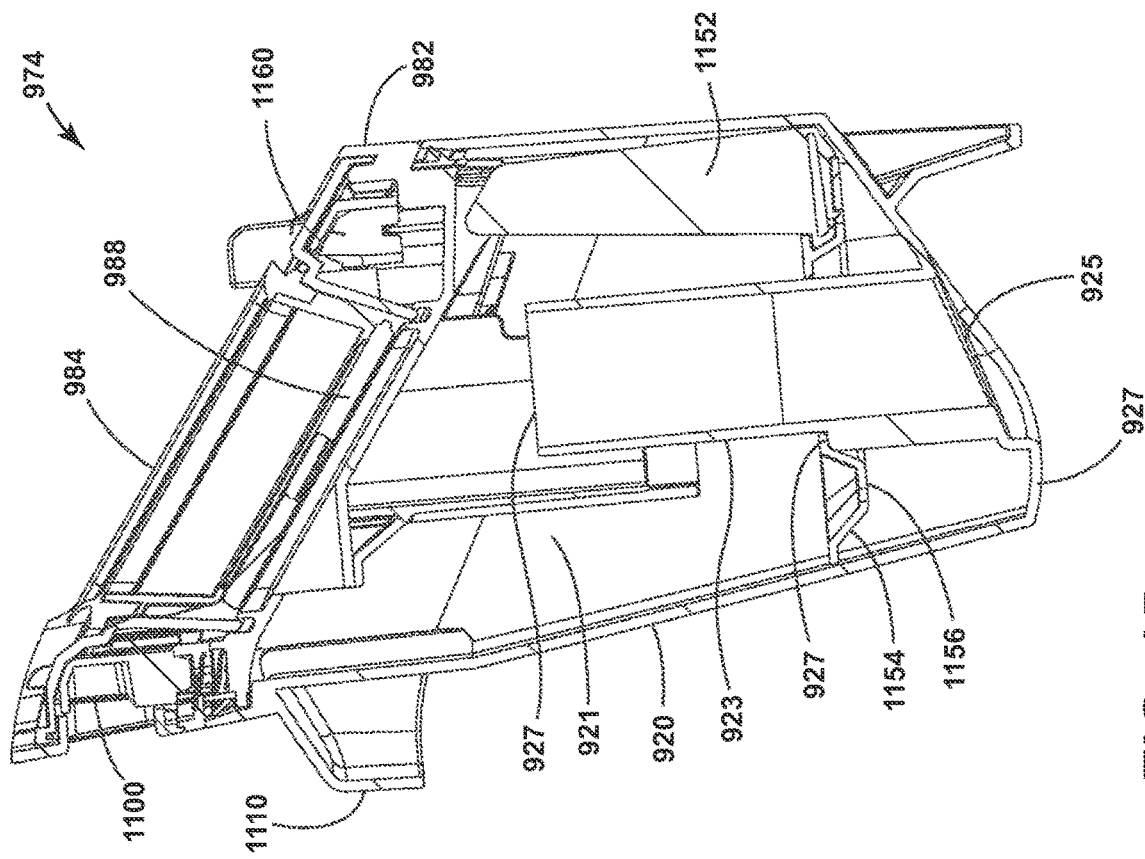
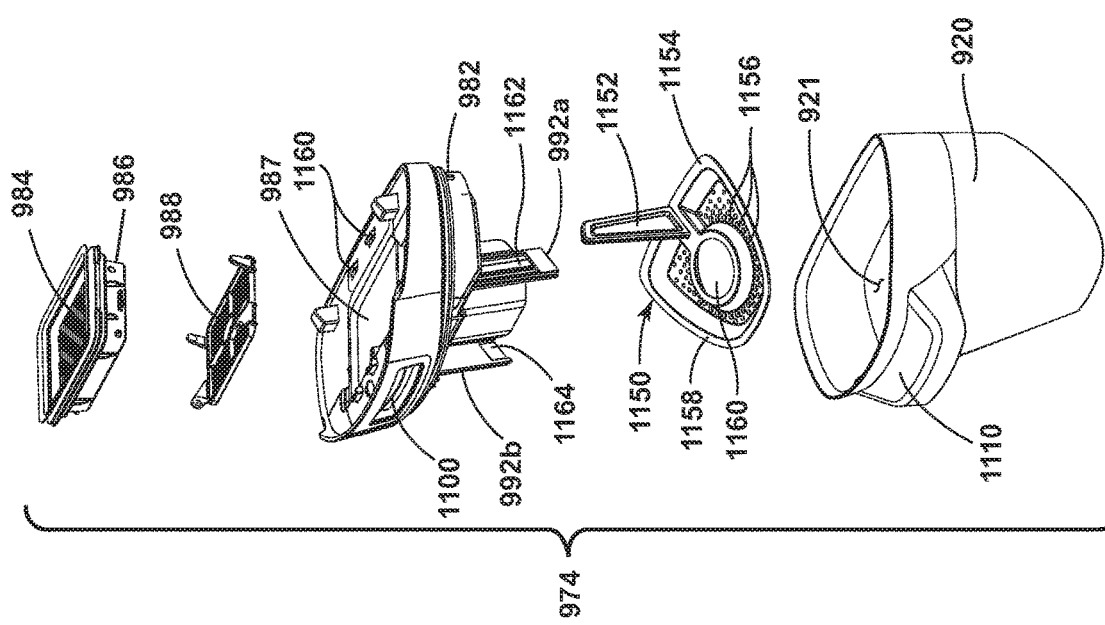

APPARATUS FOR CLEANING A SURFACE

CROSS-REFERENCE TO RELATED APPLICATIONS

This application is a continuation of U.S. patent application Ser. No. 17/252,596, filed Dec. 15, 2020, which is a National Phase application of International Application No. PCT/US2019/038383 filed Jun. 21, 2019, which claims the benefit of U.S. Provisional Patent Application No. 62/688,428, filed Jun. 22, 2018, and the benefit of U.S. Provisional Patent Application No. 62/789,661, filed Jan. 8, 2019, all of which are incorporated herein by reference in their entirety.

BACKGROUND

Several different types of apparatus are known for cleaning a surface. One category of floor cleaning apparatus includes extraction cleaners for deep cleaning carpets and other fabric surfaces, such as upholstery. Most carpet extractors comprise a liquid delivery system and a liquid recovery system. The liquid delivery system typically includes one or more liquid supply tanks for storing a supply of cleaning liquid, a liquid distributor for applying the cleaning liquid to the surface to be cleaned, and a liquid supply conduit for delivering the cleaning liquid from the liquid supply tank to the liquid distributor. The liquid recovery system usually comprises a recovery tank, a nozzle adjacent the surface to be cleaned and in fluid communication with the recovery tank through a working air conduit, and a source of suction in fluid communication with the working air conduit to draw the cleaning liquid from the surface to be cleaned and through the nozzle and the working air conduit to the recovery tank.

Extraction cleaners for typical household use can be configured as an upright unit having a base for movement across a surface to be cleaned and an upright body pivotally mounted to a rearward portion of the base for directing the base across the surface to be cleaned, a canister unit having a cleaning implement connected to a wheeled base by a suction hose, or a portable extractor adapted to be hand carried by a user for cleaning relatively small areas.

BRIEF SUMMARY

Aspects of the present disclosure relate to a surface cleaning device, including a base adapted for contacting a surface of a surrounding environment to be cleaned, a suction source, a suction nozzle assembly provided on the base and defining a suction nozzle in fluid communication with the suction source, a fluid delivery and recovery system, including a fluid supply tank adapted to hold a supply of fluid, a fluid dispenser in fluid communication with the fluid supply tank, and a recovery container in fluid communication with the suction nozzle, a sensor assembly provided with the body assembly and located adjacent to the recovery container.

BRIEF DESCRIPTION OF THE DRAWINGS

In the drawings:

FIG. 14 is an exploded perspective view of another recovery tank assembly that can be included in the surface cleaning apparatus of FIG. 2.

FIG. 15 is a cross-sectional view though the assembled recovery tank assembly of FIG. 13.

DETAILED DESCRIPTION

The present disclosure relates to an apparatus for cleaning a surface, such as an extraction cleaner that delivers cleaning liquid to a surface to be cleaned and extracts spent cleaning liquid and debris (which may include dirt, dust, stains, soil, hair, and other debris) from the surface. In one aspect the surface cleaning apparatus is a multi-surface wet vacuum cleaner that can be used to clean hard floor surfaces such as tile and hardwood and soft floor surfaces such as carpet.

According to an aspect of the disclosure, a fluid delivery system for storing cleaning fluid and delivering the cleaning fluid to the surface to be cleaned can be included in the apparatus. The fluid delivery system can include a supply tank removably mounted on a housing of the apparatus. The apparatus can further include a latch for securing the supply tank to the housing. The latch can include a spring-loaded latch configured to release the supply tank upon application a sufficient force to overcome the biased latching force of the latch. A user can conveniently apply sufficient force to the supply tank itself to pull the supply tank off the housing. The spent cleaning liquid and debris can be stored in a recovery container within the apparatus. In certain examples, the recovery tank can further include a removable tank strainer configured to strain large debris and hair out of the tank prior to emptying.

In one aspect of the present disclosure, a sensing system operably coupled to the recovery container can elicit an action upon a detection of liquid or foam within the recovery container at a predetermined level. The recovery system can include a "floatless" sensing system having an electronic liquid level sensing system configured to detect liquid at one or more levels within the recovery tank and determine when to shut-off or otherwise interrupt the recovery system.

Sensing systems disclosed herein include, by way of non-limiting examples, include a high frequency fluid and foam sensor including one example having three probes: one for transmitting and two receiving probes including one for fluid and one for foam sensing and another example includes two probes with one transmitting probe and one receiving probe configured for fluid sensing. Another aspect of a sensing system described herein includes conductivity sensing system featuring two probes including in one aspect having pins insert-molded into the sidewalls of the recovery container. Yet another aspect includes a self-capacitive sensing system where the probes are conductive pads mounted on the handle assembly behind the recovery tank. Further still, an accelerometer can be included such that the sensing system can estimate the tank fill level or volume of liquid in the tank as the floor cleaning device is operated as the accelerometer provides an orientation of the tank and the capacitance sensing provides a fluid level for the given orientation.

Figure 1:
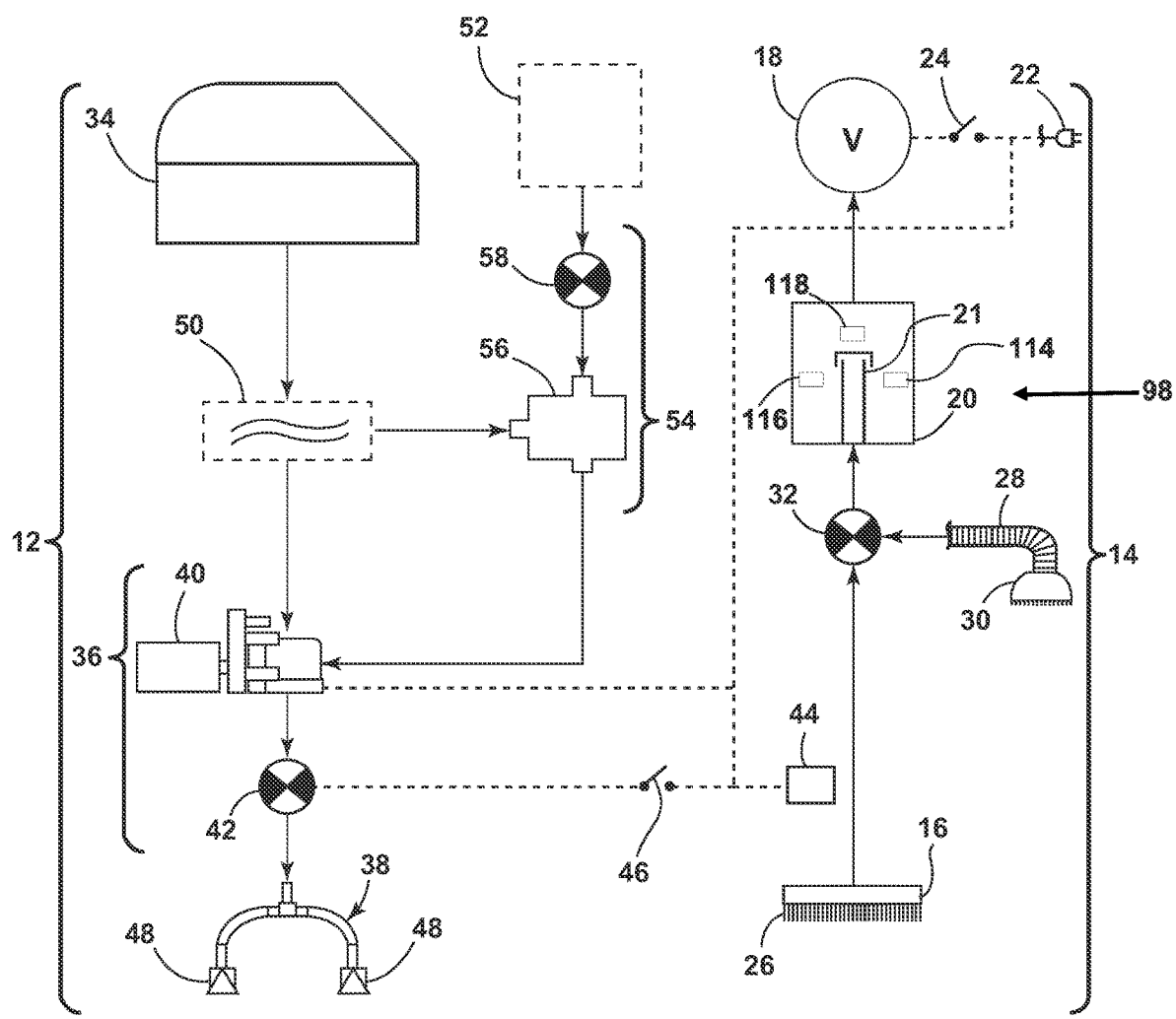
FIG. 1 is a schematic view of an apparatus for cleaning a surface illustrated as an extraction cleaner according to an aspect of the present disclosure.

FIG. 1 is a schematic view of various functional systems of an extraction cleaning apparatus in the form of an extraction cleaner 10. The extraction cleaner 10 can have similarities to the extraction cleaner described in U.S. Patent Application Publication No. 2017/0119225, published May 4, 2017 and U.S. Patent Application Publication No. 2015/0108244, published Apr. 23, 2015, both of which are incorporated herein by reference in their entirety.

The functional systems of the extraction cleaner 10 can be arranged into any desired configuration, such as an upright extraction device having a base and an upright body for directing the base across the surface to be cleaned, a canister device having a cleaning implement connected to a wheeled base by a suction hose, a portable extractor adapted to be hand carried by a user for cleaning relatively small areas, or a commercial extractor.

The extraction cleaner 10 can include a liquid delivery system 12 for storing cleaning liquid and delivering the cleaning liquid to the surface to be cleaned and a recovery system 14 for removing the spent cleaning liquid and debris from the surface to be cleaned and storing the spent cleaning liquid and debris.

The recovery system 14 can include a suction nozzle 16, a suction source 18 in fluid communication with the suction nozzle 16 for generating a working air stream, and a recovery container 20 for separating and collecting liquid and debris from the working airstream for later disposal. A separator 21 can be formed in a portion of the recovery container 20 for separating liquid and entrained debris from the working airflow. The recovery container 20 can include a fluid level sensing assembly 98 that includes at least one probe 114. As illustrated in FIG. 1, the fluid level sensing assembly 98 can further include, a second probe 116, and a third probe 118, though any number of probes can be included depending upon the implementation. The probes 114, 116, 118 in the recovery container 20 can communicate with a controller (not shown). The fluid level sensing assembly 98 can determine when various component(s) or sub-systems of the extraction cleaner should be selectively activated or de-energized to prevent an overfill condition in the recovery container 20. An overfill condition in the recovery container 20 is undesirable because it can cause fluid or foam to leak or spill from the extraction cleaner, thereby soiling the machine and surface to be cleaned. In addition, an overfill condition can cause liquid or foam ingress into the suction source 18, which can damage internal components thereof, such as electrical components and bearings, for example.

The suction source 18, such as a motor/fan assembly, is provided in fluid communication with the recovery container 20. The suction source 18 can be electrically coupled to a power source 22, such as a battery or by a power cord plugged into a household electrical outlet. A suction power switch 24 between the suction source 18 and the power source 22 can be selectively closed by the user, thereby activating the suction source 18.

The suction nozzle 16 can be provided on a base or cleaning head adapted to move over the surface to be cleaned. An agitator 26 can be provided adjacent to the suction nozzle 16 for agitating the surface to be cleaned so that the debris is more easily ingested into the suction nozzle 16. Some examples of agitators include, but are not limited to, a horizontally-rotating brushroll, dual horizontally-rotating brushrolls, one or more vertically-rotating brushrolls, or a stationary brush.

The extraction cleaner 10 can also be provided with above-the-floor cleaning features. A vacuum hose 28 can be selectively fluidly coupled to the suction source 18 for above-the-floor cleaning using an above-the floor cleaning tool 30 with its own suction inlet. A diverter assembly 32 can selectively switch between on-the-floor and above-the floor cleaning by diverting fluid communication between either the suction nozzle 16 or the vacuum hose 28 with the suction source 18.

The liquid delivery system 12 can include at least one liquid container 34 for storing a supply of liquid. The liquid can include one or more of any suitable cleaning liquids, including, but not limited to, water, compositions, concentrated detergent, diluted detergent, etc., and mixtures thereof. For example, the liquid can include a mixture of water and concentrated detergent.

The liquid delivery system 12 can further include a flow control system 36 for controlling the flow of liquid from the container 34 to a liquid distributor 38. In one configuration, the flow control system 36 can include a pump 40 which pressurizes the liquid delivery system 12 and a flow control valve 42 which controls the delivery of liquid to the distributor 38. An actuator 44 can be provided to actuate the flow control system 36 and dispense liquid to the distributor 38. The actuator 44 can be operably coupled to the valve 42 such that pressing the actuator 44 will open the valve 42. The valve 42 can be electrically actuated, such as by providing an electrical switch 46 between the valve 42 and the power source 22 that is selectively closed when the actuator 44 is pressed, thereby powering the valve 42 to move to an open position. In one example, the valve 42 can be a solenoid valve. The pump 40 can also be coupled with the power source 22.

The liquid distributor 38 can include at least one distributor outlet 48 for delivering liquid to the surface to be cleaned. The at least one distributor outlet 48 can be positioned to deliver liquid directly to the surface to be cleaned, or indirectly by delivering liquid onto the agitator 26. The at least one distributor outlet 48 can include any structure, such as a nozzle or spray tip; multiple outlets 48 can also be provided. As illustrated in FIG. 1, the distributor 38 can include two outlets 48 which distribute cleaning liquid to the surface to be cleaned. For above-the-floor cleaning, the cleaning tool 30 can include an auxiliary distributor (not shown) coupled with the liquid delivery system 12.

Optionally, a heater 50 can be provided for heating the cleaning liquid prior to delivering the cleaning liquid to the surface to be cleaned. In the example illustrated in FIG. 1, an in-line heater 50 can be located downstream of the container 34 and upstream of mixing pump 40. Other types of heaters 50 can also be used. In yet another example, the cleaning liquid can be heated using exhaust air from a motor-cooling pathway for the suction source 18.

As another option, the liquid delivery system can be provided with a second container 52 for storing a cleaning liquid. For example, the first container 34 can store water and the second container 52 can store a cleaning agent such as detergent. The containers 34, 52 can, for example, be defined by a supply tank and/or a collapsible bladder. In one configuration, the first container 34 can be a bladder that is provided within the recovery container 20. Alternatively, a single container can define multiple chambers for different liquids.

In the case where multiple containers 34, 52 are provided, the flow control system 36 can further be provided with a mixing system 54 for controlling the composition of the cleaning liquid that is delivered to the surface. The composition of the cleaning liquid can be determined by the ratio of cleaning liquids mixed together by the mixing system. As shown herein, the mixing system 54 includes a mixing manifold 56 that selectively receives liquid from one or both of the containers 34, 52. A mixing valve 58 is fluidly coupled with an outlet of the second container 52, whereby when mixing valve 58 is open, the second cleaning liquid will flow to the mixing manifold 56. By controlling the orifice of the mixing valve 58 or the time that the mixing valve 58 is open, the composition of the cleaning liquid that is delivered to the surface can be selected.

In yet another configuration of the liquid delivery system 12, the pump 40 can be eliminated and the distributor 38 can include a gravity-feed system having a valve fluidly coupled with an outlet of the container(s) 34, 52, whereby when valve is open, liquid will flow under the force of gravity to the distributor 38. The valve can be mechanically actuated or electrically actuated, as described above.

The extraction cleaner 10 shown in FIG. 1 can be used to effectively remove debris and liquid from the surface to be cleaned in accordance with the following method. The sequence of steps discussed is for illustrative purposes only and is not meant to limit the method in any way as it is understood that the steps may proceed in a different logical order, additional or intervening steps may be included, or described steps may be divided into multiple steps, without detracting from aspects of the present disclosure.

Figure 2:
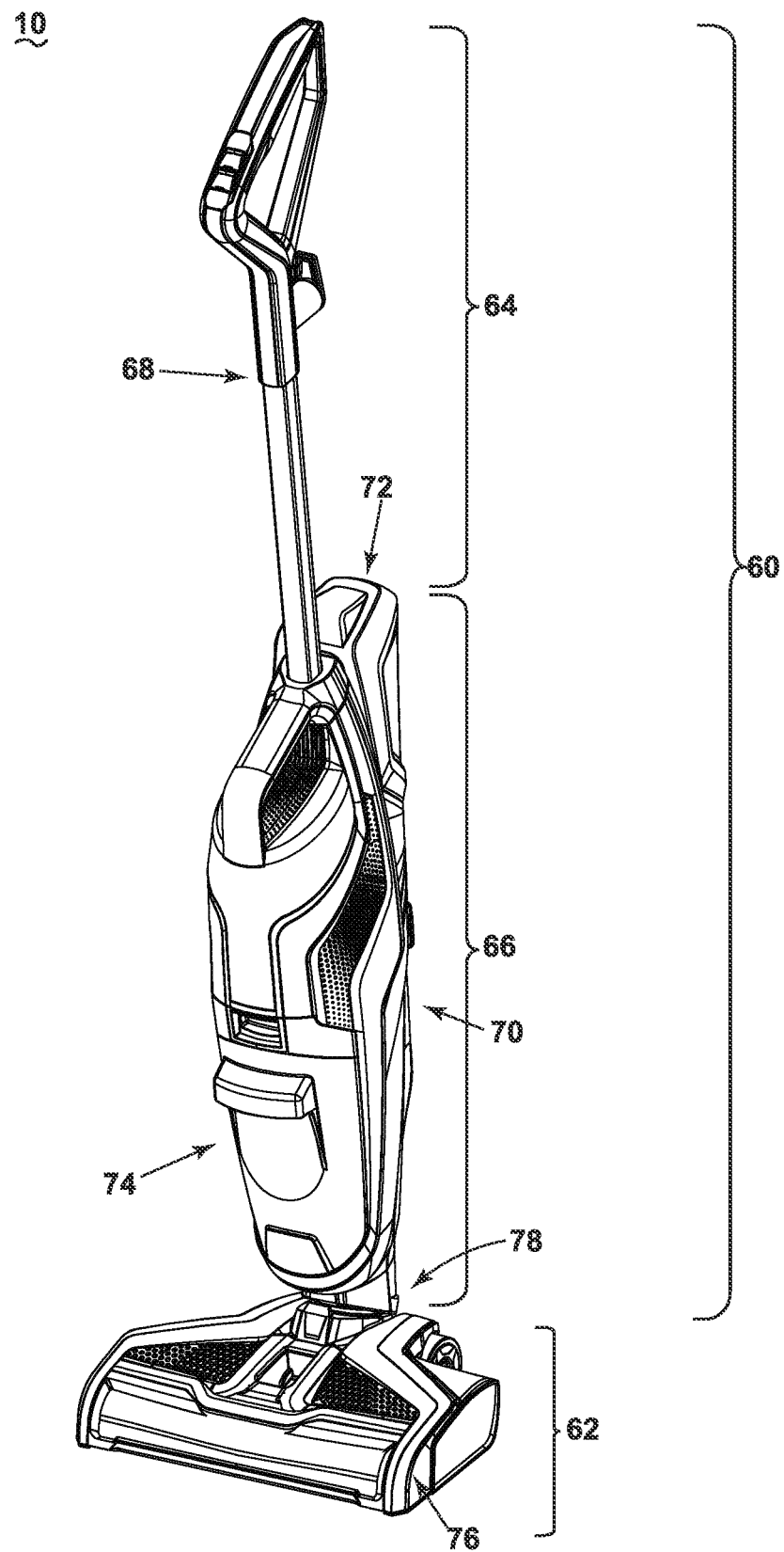
FIG. 2 is a perspective view of a surface cleaning apparatus according to one aspect of the present disclosure.

FIG. 2 is a perspective view illustrating one non-limiting example of a surface cleaning apparatus in the form of multi-surface wet vacuum extraction cleaner 10, according to one aspect of the present disclosure. As illustrated herein, the extraction cleaner 10 is an upright multi-surface wet vacuum cleaner having a housing that includes an upright body or handle assembly 60 and a base 62 pivotally and/or swivel mounted to the upright handle assembly 60 and adapted for movement across a surface to be cleaned. For purposes of description related to the figures, the terms "upper," "lower," "right," "left," "rear," "front," "vertical," "horizontal," "inner," "outer," and derivatives thereof shall relate as oriented in FIG. 2 from the perspective of a user behind the extraction cleaner 10, which defines the rear of the extraction cleaner 10. However, it is to be understood that aspects of the present disclosure may assume various alternative orientations, except where expressly specified to the contrary.

The upright handle assembly 60 includes an upper handle 64 and a frame 66. Upper handle 64 includes a handle assembly 68. Frame 66 includes a main support section or body assembly 70 supporting at least a clean tank assembly 72 and a recovery tank assembly 74, and may further support additional components of the handle assembly 60. The base 62 includes a foot assembly 76. The extraction cleaner 10 can include a fluid delivery or supply pathway, including and at least partially defined by the clean tank assembly 72, for storing cleaning fluid and delivering the cleaning fluid to the surface to be cleaned and a fluid recovery pathway, including and at least partially defined by the recovery tank assembly 74, for removing the spent cleaning fluid and debris from the surface to be cleaned and storing the spent cleaning fluid and debris until emptied by the user.

A pivotable swivel joint assembly 78 is formed at a lower end of the frame 66 and moveably mounts the base 62 to the handle assembly 60. In the illustrated aspect of the present disclosure, the base 62 can pivot up and down about at least one axis relative to the handle assembly 60. The pivotable swivel joint assembly 78 can alternatively include a universal joint, such that the base 62 can pivot about at least two axes relative to the handle assembly 60. Wiring and/or conduits supplying air and/or liquid between the base 62 and the handle assembly 60, or vice versa, can extend though the pivotable swivel joint assembly 78. A swivel locking mechanism (not shown) can be provided to lock and/or release the swivel joint assembly 78 for movement.

Figure 3:
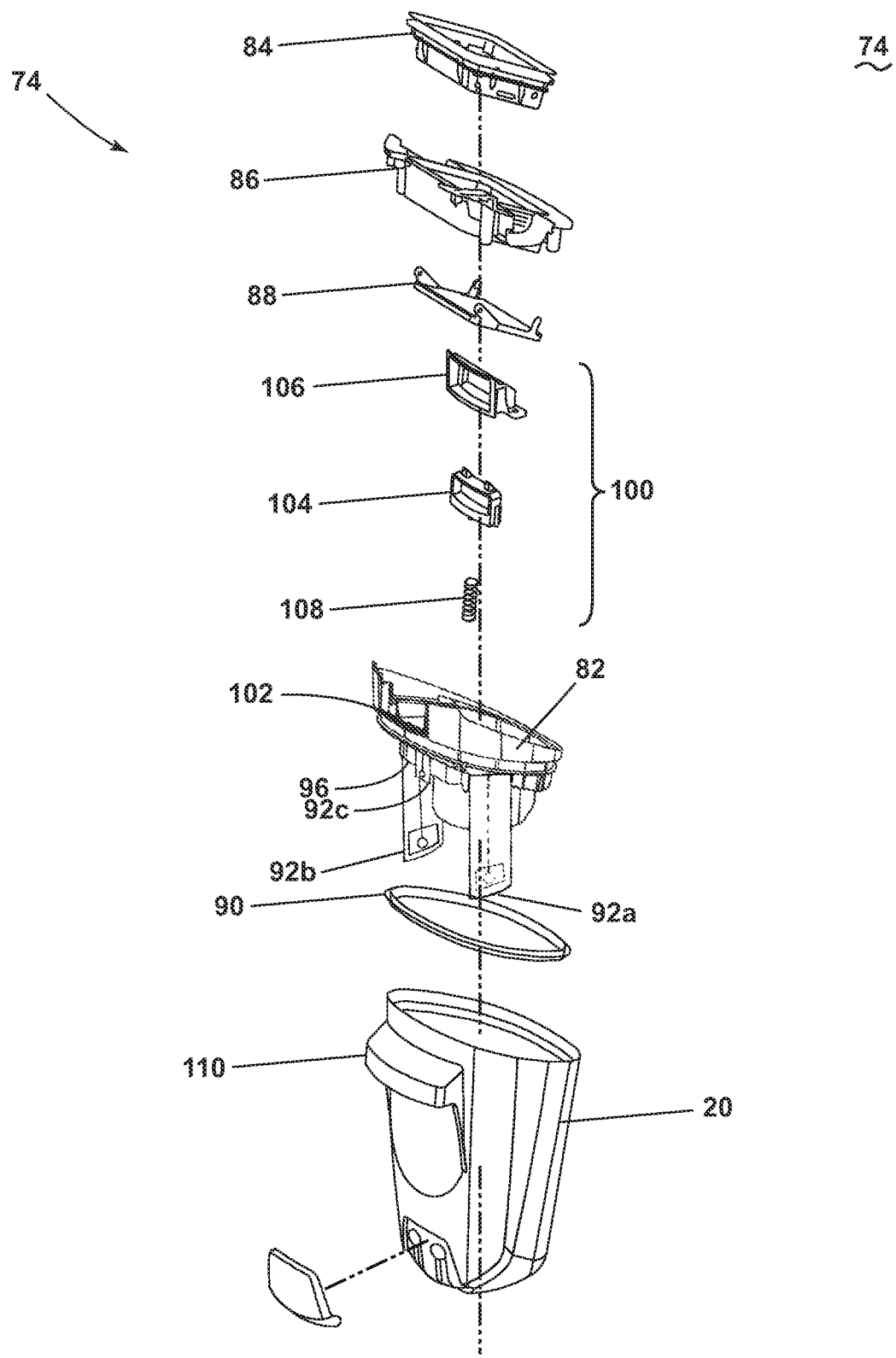
FIG. 3 is an exploded perspective view of the recovery tank assembly of the surface cleaning apparatus of FIG. 2.

FIG. 3 is an exploded perspective view of the recovery tank assembly 74. The recovery tank assembly 74 generally includes the collection container for the fluid recovery system. In the present example, the recovery tank assembly 74 includes the recovery container 20 with an integral hollow standpipe formed therein. A lid 82 sized for receipt on the recovery container 20 supports a pleated filter 84 in a filter cover plate 86 mounted to the lid 82 with a mesh screen 88 therebetween. The details of the pleated filter 84 and mesh screen 88 are not shown herein. Preferably, the pleated filter 84 is made of a material that remains porous when wet. The extraction cleaner 10 can also be provided with one or more additional filters upstream or downstream. A gasket 90 positioned between mating surfaces of the lid 82 and the recovery container 20 creates a seal therebetween for prevention of leaks.

A releasable latch 100 is provided to facilitate removal of the recovery tank assembly 74 for emptying or cleaning. The releasable latch 100 can be positioned in an aperture 102 on a front side of the lid 82. The releasable latch 100 can include a latch button 104 held within a latch bracket 106 and biased with latch spring 108 toward an engaged or latched position. The latch button 104 releasably engages with a front cover (not shown) to removably secure the recovery tank assembly 74 to the body assembly 70 (FIG. 2). A hand grip 110 can be provided on the recovery container 20 and located below the latch 100 to facilitate handling of the recovery tank assembly 74.

A shut-off valve (not shown) can be provided for interrupting suction when liquid or foam in the recovery container 20 reaches a predetermined level. The shut-off valve can be positioned in any suitable manner and include any suitable type of valve. The fluid level sensing assembly 98 can be configured to determine when such shut-off valve should be activated. The fluid level sensing assembly 98 can include any suitable assembly for sensing one of at least liquid or foam at one or more levels within the recovery container 20 or other portions of the extraction cleaner 10. In the illustrated example, at least one side bracket assembly 92a, 92b is fixedly attached to the lid 82 in a position offset from the standpipe (not shown). Further still, at least one front bracket assembly 92c is attached to the lid 82 adjacent an air outlet 96.

Figure 4:
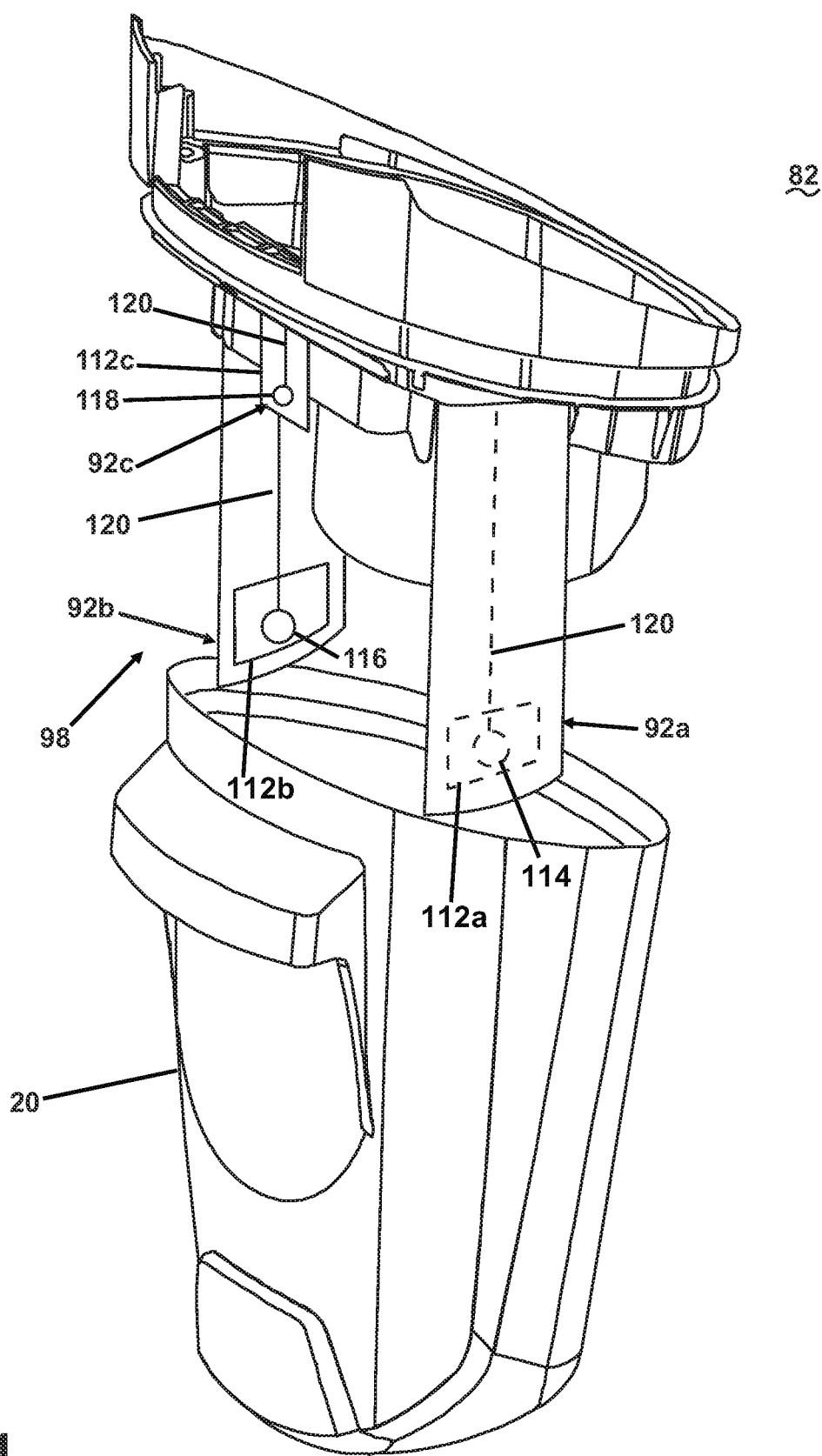
FIG. 4 is an enlarged view of the lid from FIG. 3.

FIG. 4 is an enlarged perspective view of the lid 82 that includes a non-limiting example of the fluid level sensing assembly 98. The fluid level sensing assembly 98 includes at least one bracket assembly 92a, 92b, 92c, and at least one probe 114, 116, 118. Each probe 114, 116, 118 includes at least one conductor 112a, 112b, 112c operably coupled to a communication channel 120. In the illustrated example, the first probe 114 includes a communication channel 120 that operably couples to a first conductor 112a of a first side bracket assembly 92a. Similarly, the second probe 116 includes a communication channel 120 that operably couples to a second conductor 112b of a second side bracket assembly 92b. The first and second probes 114, 116 can be mounted at relatively the same location on the first and second side brackets 92a, 92b. The structure of the first and second side brackets 92a, 92b can be similar in dimension and can result in the first and second probes 114, 116 being at a similar depth when the lid 82 is coupled to the recovery container 20. The third probe 118 can be operably coupled to a third conductor 112c of a front bracket assembly 92c. Optionally, the third conductor 112c can communicate with the third probe 118 via a communication channel 120.

The conductors 112a, 112b, 112c can be formed of any object or material that transmits electricity including, but not limited to: metal plates; insert molded, formed metal plates with selectively exposed sections; metal pins with selectively masked upper sections; etc. Selectively masked or selectively exposed materials can be configured such that the masked or exposed areas are selected to enhance the sensing performance of the probe 114, 116, 118.

One or more communication channels 120 can couple to the first probe 114, second probe 116, and third probe 118, respectively. The communication channels 120 can be formed of any physical transmission media useful for transmitting signals or conveying data including, but is not limited to, copper wire, twisted pair wire, fiber optic cable, printed circuit board trace, solder, or, in the case of wireless signals, air.

It has been considered that any number of additional bracket assemblies can be coupled to a variety of locations on the lid 82. The location of at least one probe with at least one conductor can be located in any position relative to the bracket assembly. When the lid 82 is coupled to the recovery container 20, the side bracket assemblies 92a, 92b and front bracket assembly 92c can be contained within the recovery container 20. It is further contemplated that the probes 114, 116, 118 can be molded directly into the side walls of the recovery tank 20, thereby eliminating the bracket assemblies.

Figure 5:
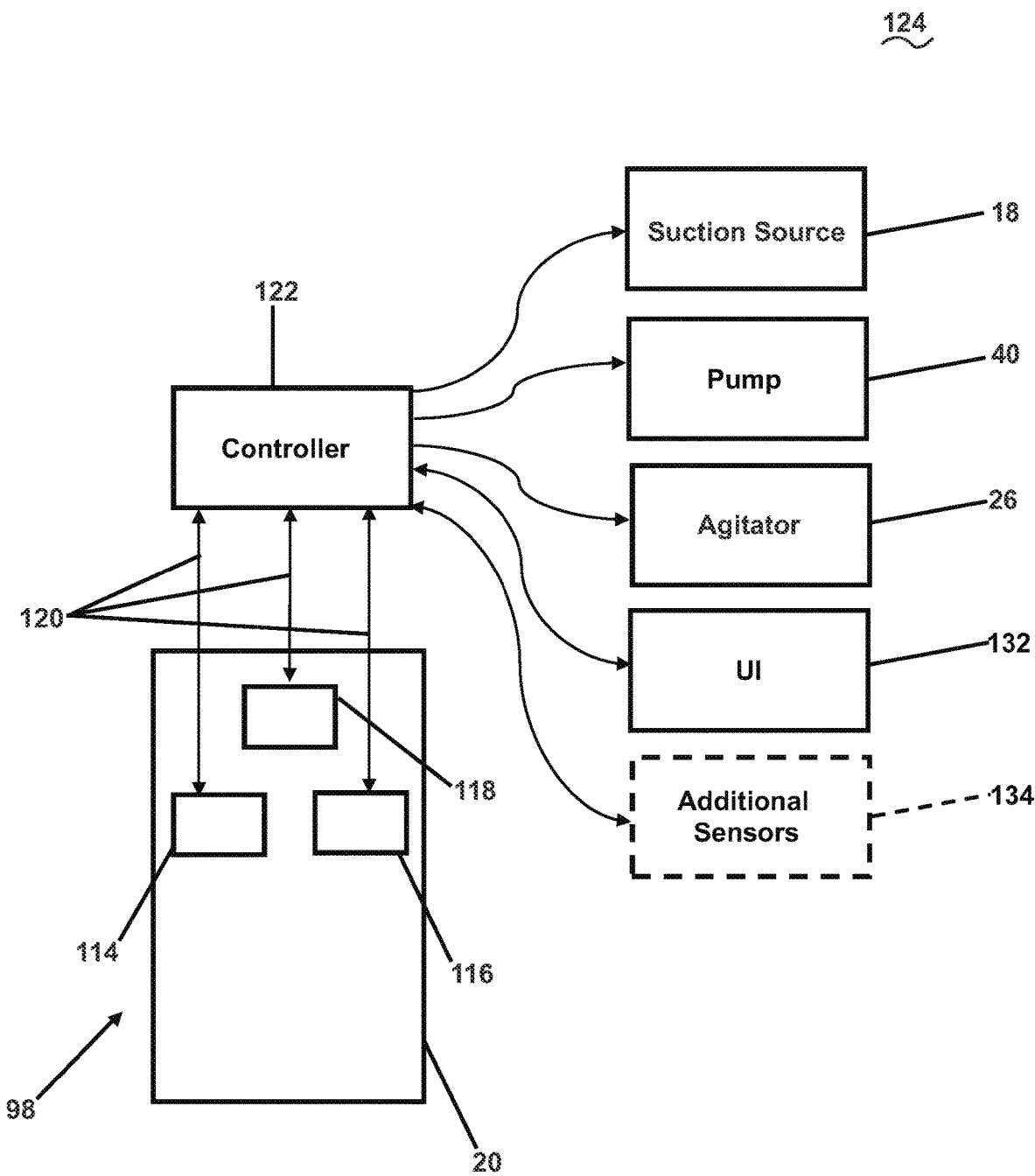
FIG. 5 is a schematic view of the control system for the cleaning apparatus of FIG. 1 and FIG. 2.

FIG. 5 is a schematic view of the control system 124 for the extraction cleaner 10. The controller 122 can couple to the first probe 114, second probe 116, and third probe 118 of the fluid level sensing assembly 98 using one or more communication channels 120. The controller 122 can also be operationally connected to other aspects of the extraction cleaner 10. A non-limiting example of objects operationally connected with the controller 122 include the suction source 18, a pump 40, an agitator 26, a user interface 132, or additional sensors 134. Additional sensors 134 can include, but are not limited to, additional recovery tank sensors, temperature sensors, shut off valves, or electrical switches.

In operation, the extraction cleaner 10 is prepared for use by coupling the extraction cleaner 10 to the power source 22, and by filling the first container 34, and optionally the second container 52, with cleaning liquid. Cleaning liquid is selectively delivered to the surface to be cleaned via the liquid delivery system 12 by user-activation of the actuator 44, while the extraction cleaner 10 is moved back and forth over the surface. The agitator 26 can simultaneously agitate the cleaning liquid into the surface to be cleaned. During operation of the recovery system 14, the extraction cleaner 10 draws in liquid and debris-laden working air through the suction nozzle 16 or cleaning tool 30, depending on the position of the diverter assembly 32, and into the downstream recovery container 20 where the liquid debris is substantially separated from the working air. The air flow then passes through the suction source 18 prior to being exhausted from the extraction cleaner 10. The recovery container 20 can be periodically emptied of collected liquid and debris.

Figure 6:
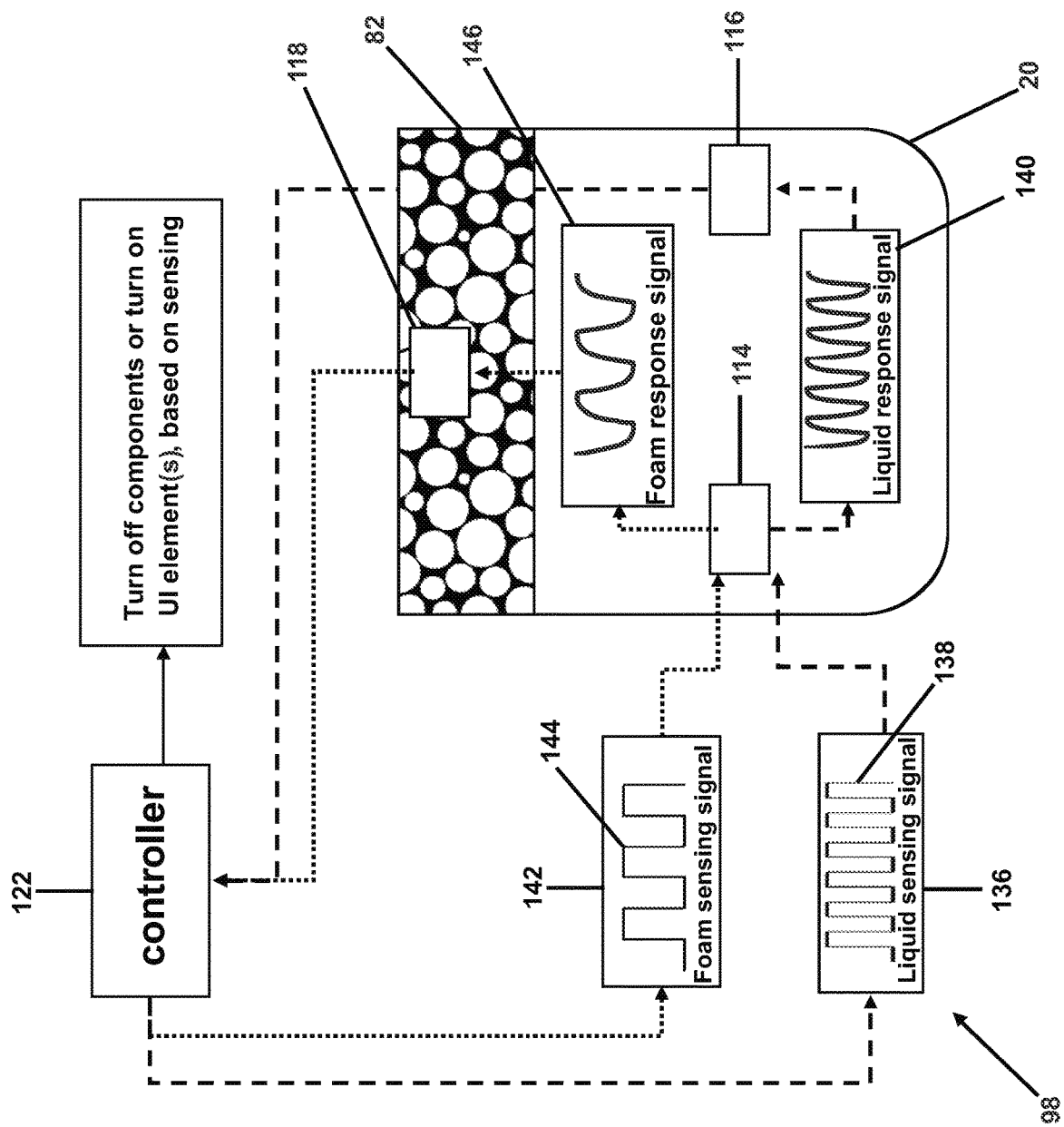
FIG. 6 is a schematic view of a sensing system from FIG. 1.

During operation, the recovery container 20 is typically coupled to the lid 82. As illustrated in FIG. 6, the first probe 114 of the fluid level sensing assembly 98 can emit a liquid sensing signal 136 from the controller 122 at a first frequency 138. The liquid sensing signal 136 travels from the first probe 114 through contents of the recovery container 20 to form a liquid response signal 140 that is detected by the second probe 116. The second probe 116 can be located in the recovery container 20 at a critical liquid level. The term critical liquid level is used herein to define a level or location where, if liquid is present, the cleaning/suction components (e.g. the suction source 18 and the liquid delivery system 12) of the extraction cleaner 10 should be shut down to prevent liquid ingress into the suction source 18. The liquid response signal 140 received by the second probe 116 is communicated with the controller 122. Based on the liquid response signal 140, the controller 122 can turn off components of the extraction cleaner 10. Additionally or alternatively, the controller 122, based on the liquid response signal 140, can provide a visual or audible signal such as a light or sound via the user interface 132. The light or sound can provide an alert to the user that the liquid is too high in the recovery container 20 or that portions of the extraction cleaner 10 have been turned off. In yet another configuration, the controller 122 can additionally or alternatively activate a shut-off valve in response to the liquid response signal 140 to prevent liquid ingress into the suction source 18.

The first probe 114 can also emit a foam sensing signal 142 from the controller 122 at a second frequency 144. The foam sensing signal 142 travels from the first probe 114 through contents of the recovery container 20 to form a foam response signal 146 that is detected by the third probe 118. The third probe 118 can be located in the recovery container 20 at a critical foam level; that is, the location where, if foam is present, the cleaning/suction components of the extraction cleaner 10 should be shut down to prevent foam ingress into the suction source 18. The foam response signal 146 received by the third probe 118 is communicated with the controller 122. Based on the foam response signal, the controller 122 can turn off components of the extraction cleaner 10. Non-limiting examples of components that can be turned off include the suction source 18 and the liquid delivery system 12. Additionally or alternatively, the controller 122, based on the foam response signal 146, can provide a visual or audible signal such as a light or sound via the user interface 132. The light or sound can provide an alert to the user that the foam is too high in the recovery container 20. In yet another configuration, the controller 122 can additionally or alternatively activate a shut-off valve in response to the foam response signal 140 to prevent foam ingress into the suction source 18.

It will be understood that the basic function of the control system 124 is to determine if either of two tank full conditions are met. The first condition is when dense, liquid water has risen to contact both the first probe 114 and the second probe 116. The second condition is when liquid foam or thin water rivulets have filled the area between the first probe 114 and the third probe 118. Action can also be taken by the control system to shut down at least one of the suction source 18, such as the motor/fan assembly, the pump 40, or the agitator 26. Taking at least one of these actions and more beneficially all of these actions prevents additional water from being suctioned into the recovery container 20.

In one working example, the primary operation passes a 380 kHz square wave into an electrode forming the first probe 114 suspended in the recovery container 20. When liquid water bridges this electrode with the second probe 116, an electrode also suspended in the recovery container 20, the signal is received by second probe 116 with a limited slew rate. The output signal can be directed through one or more signals filters including, but not limited to analog circuitry configured to condition the signal, and the output from second probe 116 is capacitively coupled to a buffer-amp input to provide a 380 kHz analog signal output centered around zero and protecting the signal from downstream filtering. The buffer-amp provides adequate impedance from downstream circuitry and outputs an analog half-wave signal. The foam sensor is electronically similar to the liquid sensor, but a lower frequency signal (79 kHz) is transmitted effectively by foam to the third probe 118. The second op-amp channel of the buffer-amp such as provided on exemplary amplifier LM 6142, is used for the foam sensing portion of the circuit. When soap foam of sufficient density bridges between the first probe 114 and the third probe 118, the controller 112 can interpret this signal to shut down operation before excessive foam is ingested by the suction source 18.

Figure 7:
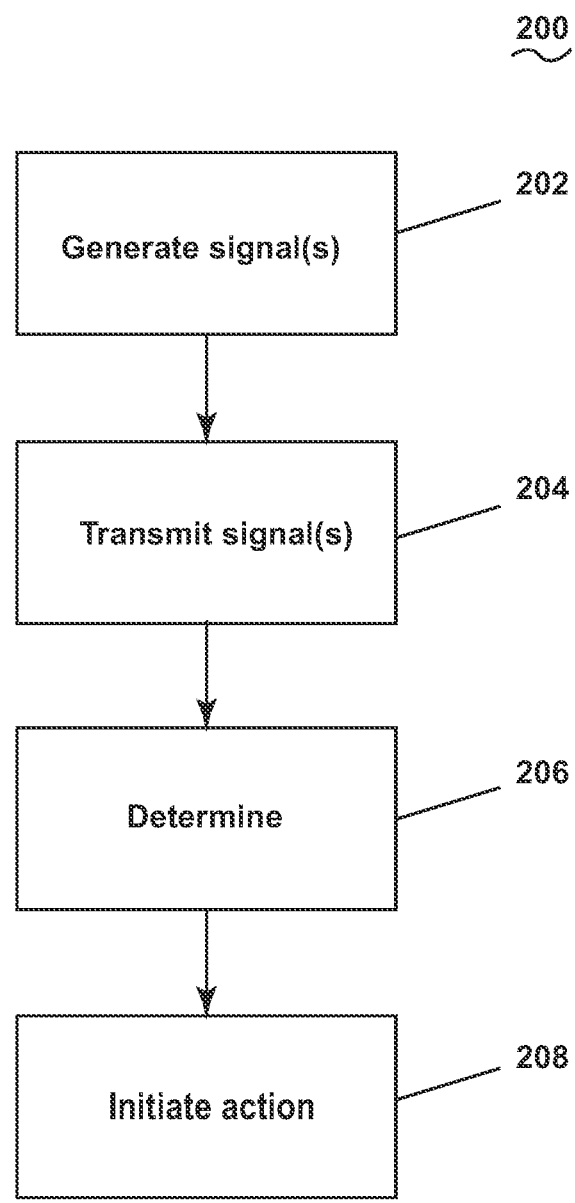
FIG. 7 illustrates a flow chart showing a method for sensing fluid such as utilizing the sensing system of FIG. 6 according to one aspect of the present disclosure.

FIG. 7 illustrates a method 200 for sensing liquid or foam using the fluid level sensing assembly 98 according to one aspect of the present disclose. At 202, the liquid sensing signal 136 is generated and emitted from the first probe 114. Additionally or alternatively at 202, the foam sensing signal 142 is generated and emitted from the first probe 114. At 204, the liquid sensing signal 136, or the foam sensing signal, or both the liquid sensing signal 136 and the foam sensing signal 142 transmit through the recovery container 20. At 206, after transmitting through the recovery container 20, the liquid and foam sensing signals 136, 142 are detected as the liquid or foam response signal 140, 146 and by the second probe 116 and the third probe 118, respectively. The second probe 116 communicates the detected liquid response signal 140 to the controller 122. Additionally or alternatively the third probe 118 communicates the detected foam response signal 146 to the controller 122. The controller 122 receives the liquid response signal 140 and determines if liquid has been sensed between the first probe 114 and the second probe 116. Additionally or alternatively at 212 the controller 122 receives the foam response signal 146 and determines if foam has been sensed between the first probe 114 and the third probe 118.

To accomplish the step 206 of determining the state of the sensed signals, the fluid level sensing assembly 98 can include additional components to condition the received signals. In one non-limiting example, the fluid level sensing assembly 98 can include electronic components to capacitively couple and smooth the signal such that the rise time of the response or the average amplitude of the voltage of the received signal can be determined. In another non-limiting example, the controller 122 can be configured to perform one or more signal processing algorithms on the received signal to determine one or more characteristics of the received signal. Signal processing algorithms incorporated into the controller 122 for assisting in the determination of one or more characteristics of the received signal can include, but are not limited to, blind source separation, principal component analysis, singular value decomposition, wavelet analysis, independent component analysis, cluster analysis, Bayesian classification, etc.

At 208, if liquid or foam have not been detected at 206 an action is initiated to repeat the method 200 including to generate the signals at 202. At 208, if liquid or foam have been detected at 206, an action is initiated to alert the user. The action that alerts the user can be, but is not limited to, turning off components of the extraction cleaner 10. Additionally or alternatively, a visual or audible signal such as a light or sound can alert a user via the user interface 132.

It is contemplated that any of the probes of the fluid level sensing assembly 98 can be configured to transmit, receive or transmit and receive one or more sensing signals. The sensing signals can include any waveform useful in sensing water or foam levels, including, but not limited to, square waves, sine waves, triangle waves, sawtooth waves, and combinations thereof. Furthermore, the sensing signals can include any frequency useful in sensing water or foam levels, including, but not limited to, frequencies ranging from approximately 10 kilohertz to 10 megahertz. In one non-limiting example, the foam sensing and liquid sensing signals can be multiplexed and transmitted simultaneously to one or more probes.

Figure 8:
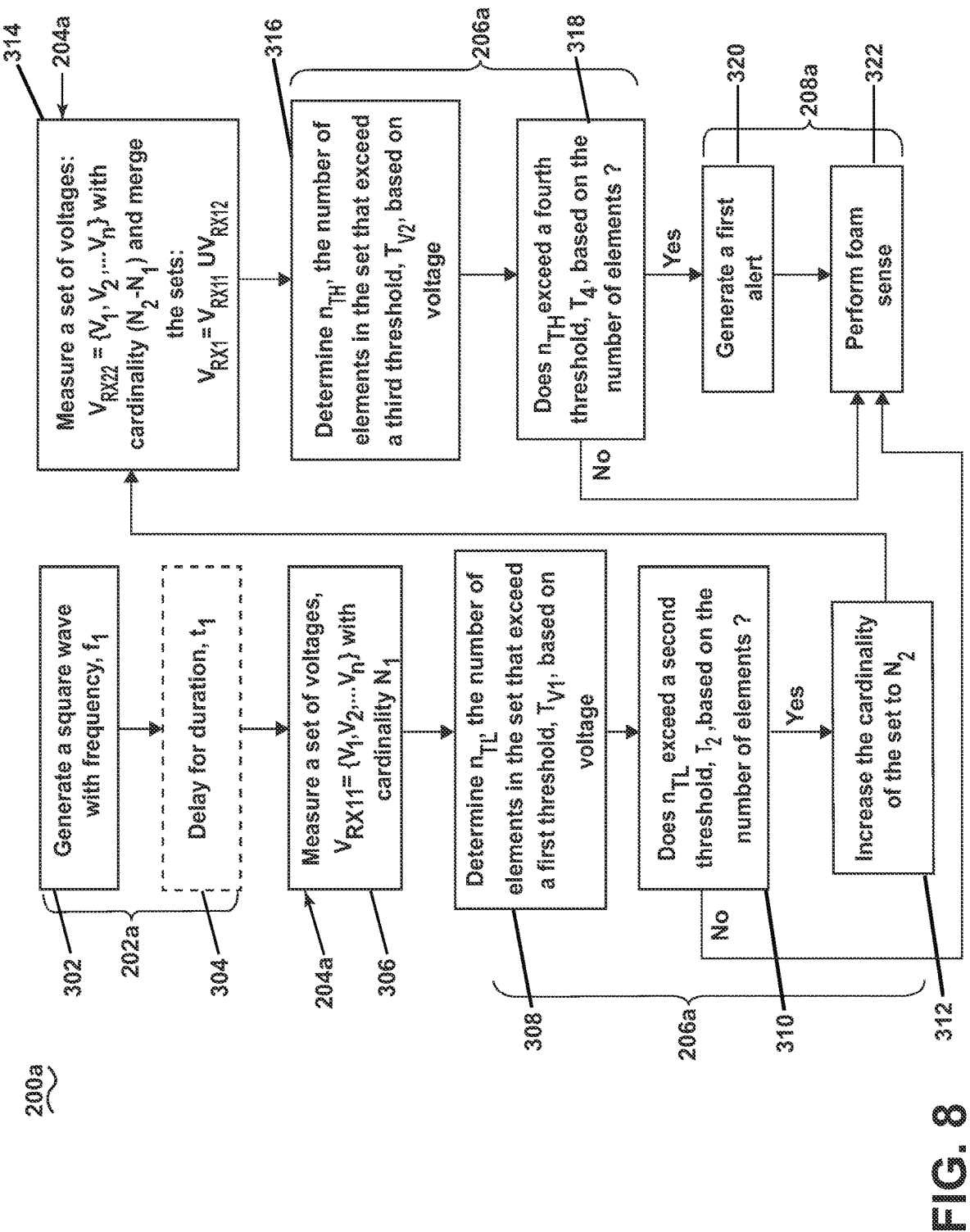
FIG. 8 illustrates a flow chart showing a method for sensing liquid such as utilizing the sensing system of FIG. 6 according to another aspect of the present disclosure.

FIG. 8 illustrates a method 200a for sensing liquid according to another aspect of the present disclose. The method 200a is similar to the method 200, however, the method 200a is specific to the detection of liquid. At 202a, generating signals can be, for example, at 302, a square wave generated by a controller 122 with a first frequency ($f_1$). A non-limiting example value for the first frequency ($f_1$) can be 380 kilohertz. A non-limiting example value for the range of the input square wave is from 0 volts to 5 volts. Optionally, at 304, a delay for duration for a first time length ($t_1$) can occur before a measurement is taken. A non-limiting example value for the first time ($t_1$) can be 30 milliseconds.

At 204a, an example of transmitting signals can include, at 306, a first set of voltages ($V_{RX11}$) are measured with a first cardinality ($N_1$). A non-limiting example value for the first cardinality ($N_1$) is 15 samples. When the first cardinality ($N_1$) is 15 samples; the first set of voltages ($V_{RX11}$) include 15 voltage measurements taken at the second probe 116.

At 206a, an example of determining can begin with the controller 122 at 308 determines how many sample voltages ($n_{TL}$) from the first set of voltages ($V_{RX11}$) exceed a first threshold ($T_{V1}$). A non-limiting example value for the first threshold ($T_{V1}$) is 683 millivolts. The number of sample voltages ($n_{TL}$) that exceed the first threshold ($T_{V1}$) is than compared to a second threshold ($T_{V2}$) at 310. If the number of sample voltages ($n_{TL}$) in the first set of voltages ($V_{RX11}$) that exceed the first threshold ($T_{V1}$) is less than the second threshold ($T_{V2}$), an action is initiated at 208*a* that can include, at 322 ending the method 200*a* for sensing liquid and beginning a method 200*b* for sensing foam.

Alternatively, in 206*a* at 310, if the number of sample voltages (nm) in the first set of voltages ($V_{RX11}$) that exceed the first threshold ($T_{V1}$) is more than the second threshold ($T_{V2}$), then the cardinality is increased at 312 so that a second set of voltages ($V_{RX12}$) has a second cardinality ($N_2$). A non-limiting example value for the second cardinality ($N_2$) is 45 samples. The second set of voltages ($V_{RX12}$) with the second cardinality ($N_2$) are measured at 314 and combined in union with the first set of voltage measurements ($V_{RX11}$) to form a merged voltage set ($V_{RX1}$) In 316, the controller 122 determines the number of elements ($n_{TH}$) in the merged voltage set ($V_{RX1}$) that exceed a third threshold ($T_{V2}$). A non-limiting example value for the third threshold ($T_{V2}$) can be 292 millivolts. At 318, the number of elements ($n_{TH}$) in the merged voltage set ($V_{RX1}$) that exceed the third threshold ($T_{V2}$) is compared to a fourth threshold ($T_4$). A non-limiting example value for the fourth threshold is 20. If the number of sample voltages ($n_{TH}$) in the merged set of voltages ($V_{RX1}$) that exceed the third threshold ($T_{V2}$) is less than the fourth threshold ($T_4$), an action is initiated at 322 of 208*a* that ends the method 200*a* for sensing liquid and begins a method 200*b* for sensing foam.

Alternatively, at 318 of 206*a*, if the number of sample voltages ($n_{TH}$) in the merged set of voltages ($V_{RX1}$) that exceed the third threshold ($T_{V2}$) is more than the fourth threshold ($T_4$), then an action is initiated at 320 of 208*a* that generates a first alert. Additionally, once the first alert is activated, the method 200*a* for sensing liquid ends and a method 200*b* for sensing foam can begin at 322. Additionally, or alternatively, once the first alert is activated at 320, the method 200*a* for sensing liquid ends and the controller 122 can disable elements of the extraction cleaner 10. Therefore, it will be understood that the method need not continue on to sense foam.

The first alert, triggered by a specific drop in voltage, indicates that liquid is present between the first probe 114 and the second probe 116, where the second probe 116 is positioned in the recovery container 20 at the critical liquid level at which point additional liquid added to the recovery container 20 could damage the extraction cleaner 10.

Figure 9:
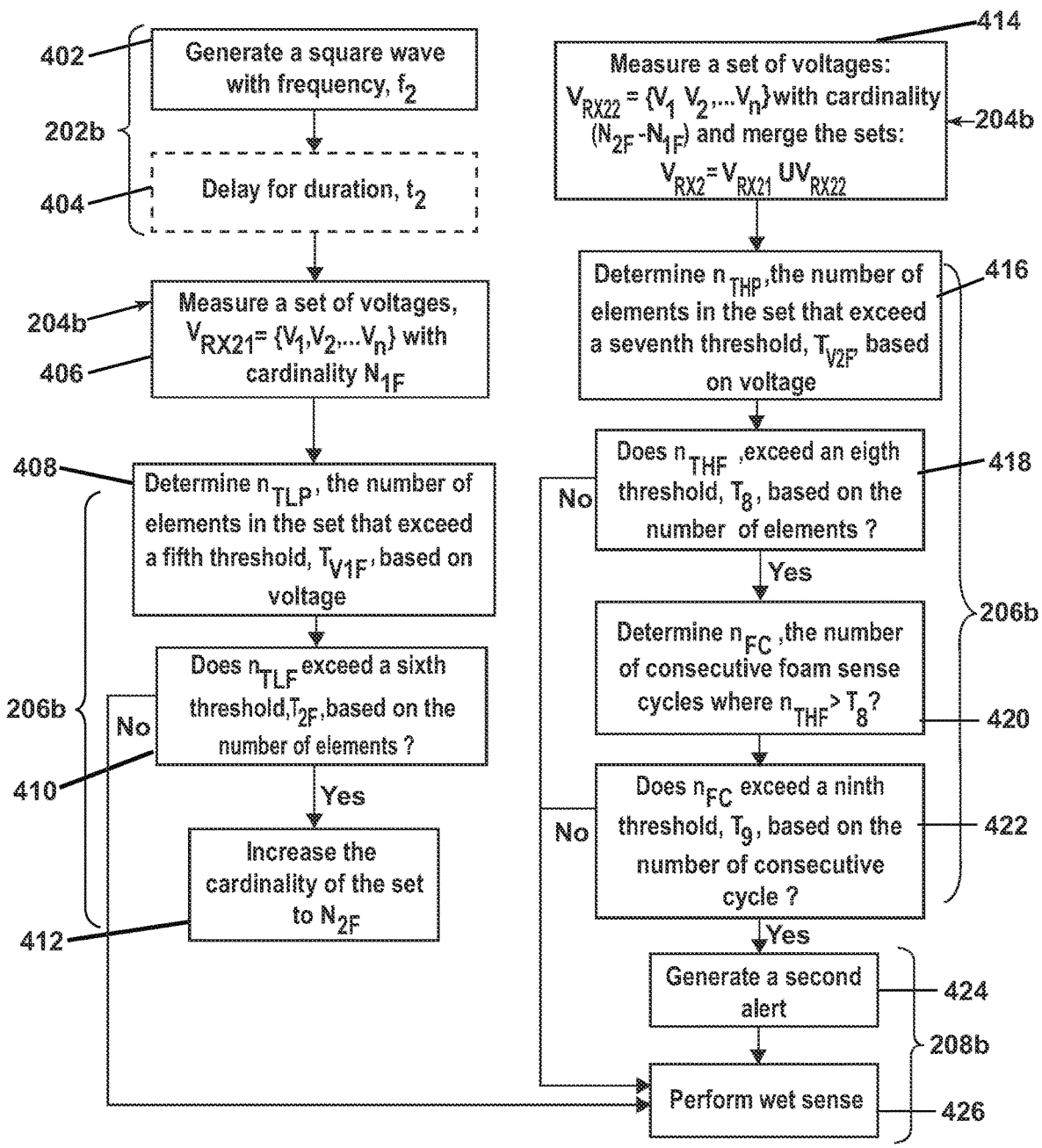
FIG. 9 illustrates a flow chart showing a method for sensing foam such as utilizing the sensing system of FIG. 6 according to yet another aspect of the present disclosure.

FIG. 9 illustrates a method 200*b* for sensing foam according to another aspect of the present disclosure. The method 200*b* is similar to the method 200, however, the method 200*b* is specific to the detection of foam. At 202*b* generating signal(s) can occur when, for example, at 402, the controller 122 generates a square wave with a second frequency ($f_2$). A non-limiting example value for the second frequency ($f_2$) can be 79 kilohertz. A non-limiting example value for the range of the input square wave is from 0 volts to 5 volts. Optionally, at 404, a delay for duration for a second time length ($t_2$) can occur before a measurement is taken. A non-limiting example value for the second time ($t_2$) can be 30 milliseconds. At 204*b*, a transmission of signal can occur, for example, at 406, when a first set of foam voltages ($V_{RX21}$) are measured with a first foam cardinality ($N_{1F}$). A non-limiting example value for the first foam cardinality ($N_{1F}$) is 15 samples. When the first foam cardinality ($N_{1F}$) is 15 samples; the first set of foam voltages ($V_{RX21}$) include 15 voltage measurements taken at the third probe 118. At 206*b*, determination can begin, for example, at 408 when the controller 122 determines how many sample foam voltages ($n_{TLF}$) from the first set of foam voltages ($V_{RX21}$) exceed a fifth threshold ($T_{V1F}$). A non-limiting example value for the fifth threshold ($T_{V1F}$) is 977 millivolts. At 410, the number of sample foam voltages ($n_{TLF}$) that exceed the fifth threshold ($T_{V1F}$) is then compared to a sixth threshold ($T_{V2F}$). At 410, if the number of sample foam voltages ($n_{TLF}$) in the first set of foam voltages ($V_{RX21}$) that exceed the fifth threshold ($T_{V1F}$) is less than the sixth threshold ($T_{V2F}$), an action is initiated at 208*b* that can be, for example, at 426, an end to the method 200*b* for sensing foam and a return to the method 200*a* for sensing liquid.

Alternatively, at 410 of 206*b*, if the number of sample foam voltages ($n_{TLF}$) in the first set of foam voltages ($V_{RX21}$) that exceed the fifth threshold ($T_{V1F}$) is more than the sixth threshold ($T_{V2F}$), then the cardinality is increased at 412 so that a second set of foam voltages ($V_{RX22}$) has a second foam cardinality ($N_{2F}$). A non-limiting example value for the second foam cardinality ($N_{2F}$) is 45 samples. The second set of foam voltages ($V_{RX22}$) with the second foam cardinality ($N_{2F}$) are measured in 414 and combined in union with the first set of foam voltage measurements ($V_{RX21}$) to form a merged foam voltage set ($V_{RX2}$) In 416, the controller 122 determines the number of foam elements ($n_{THF}$) in the merged foam voltage set ($V_{RX22}$) that exceed a seventh threshold ($T_{V2F}$). A non-limiting example value for the seventh threshold ($T_{V2F}$) can be 977 millivolts. At 418, the number of foam elements ($n_{THF}$) in the merged foam voltage set ($V_{RX2}$) that exceed the seventh threshold ($T_{V2F}$) is compared to an eighth threshold ($T_8$). A non-limiting example value for the eight threshold ($T_8$) can be 20. If the number of sample foam voltages ($n_{THF}$) in the merged foam voltage set ($V_{RX2}$) that exceed the seventh threshold ($T_{V2F}$) is less than the eighth threshold ($T_8$) at 418, an action is initiated at 208*b* that can be to end the method 200*b* for sensing foam and restart the method 200*a* for sensing liquid at 426.

Alternatively, at 418 of 206*b*, if the number of sample foam voltages ($n_{THF}$) in the merged foam voltage set ($V_{RX2}$) that exceed the seventh threshold ($T_{V2F}$) is more than the eighth threshold ($T_8$), then the controller 122 determines a number of consecutive cycles ($n_{FC}$) at 420. To calculate number of consecutive cycles ($n_{FC}$), the controller 122 can first review the merged foam voltage set ($V_{RX2}$) to find when a foam voltage from the merged foam voltage set ($V_{RX2}$) is less than the seventh threshold. Once a foam voltage element meets this qualification, the controller 122 can look at the next foam voltage element in the merged foam voltage set ($V_{RX2}$) and can count how many consecutive times the foam voltage element is less than the seventh threshold ($T_{V2F}$). At 422, the number of consecutive cycles ($n_{FC}$) in the merged foam voltage set ($V_{RX2}$) is compared to a ninth threshold ($T_9$). A non-limiting example value for the ninth threshold ($T_9$) can be 2. If the number of consecutive cycles ($n_{FC}$) in the merged foam voltage set ($V_{RX2}$) is less than the ninth threshold ($T_9$) at 422, an action is initiated at 426 of 208*b* that ends the method 200*b* for sensing foam and restarts the method 200*a* for sensing liquid.

Alternatively, in 206*b* if the number of consecutive cycles ($n_{FC}$) in the merged foam voltage set ($V_{RX2}$) is more than the ninth threshold ($T_9$), an action is initiated that generates a second alert at 424 of 208*b*.

Optionally, once the second alert is activated at 424, then at 426 the method 200*b* for sensing foam ends and the method 200*a* for sensing liquid can begin.

Additionally, or alternatively, once the second alert is activated at 424, the method 200b for sensing foam ends and the controller 122 can disable elements of the extraction cleaner 10. Therefore, it will be understood that the method need not continue on to sense liquid.

The second alert at 424, triggered by a specific drop in voltage, indicates that foam is present between the first probe 114 and the third probe 118, where the third probe 118 is positioned in the recovery container 20 at the critical foam level at which point additional foam added to the recovery container 20 could damage the extraction cleaner 10.

Figure 10:
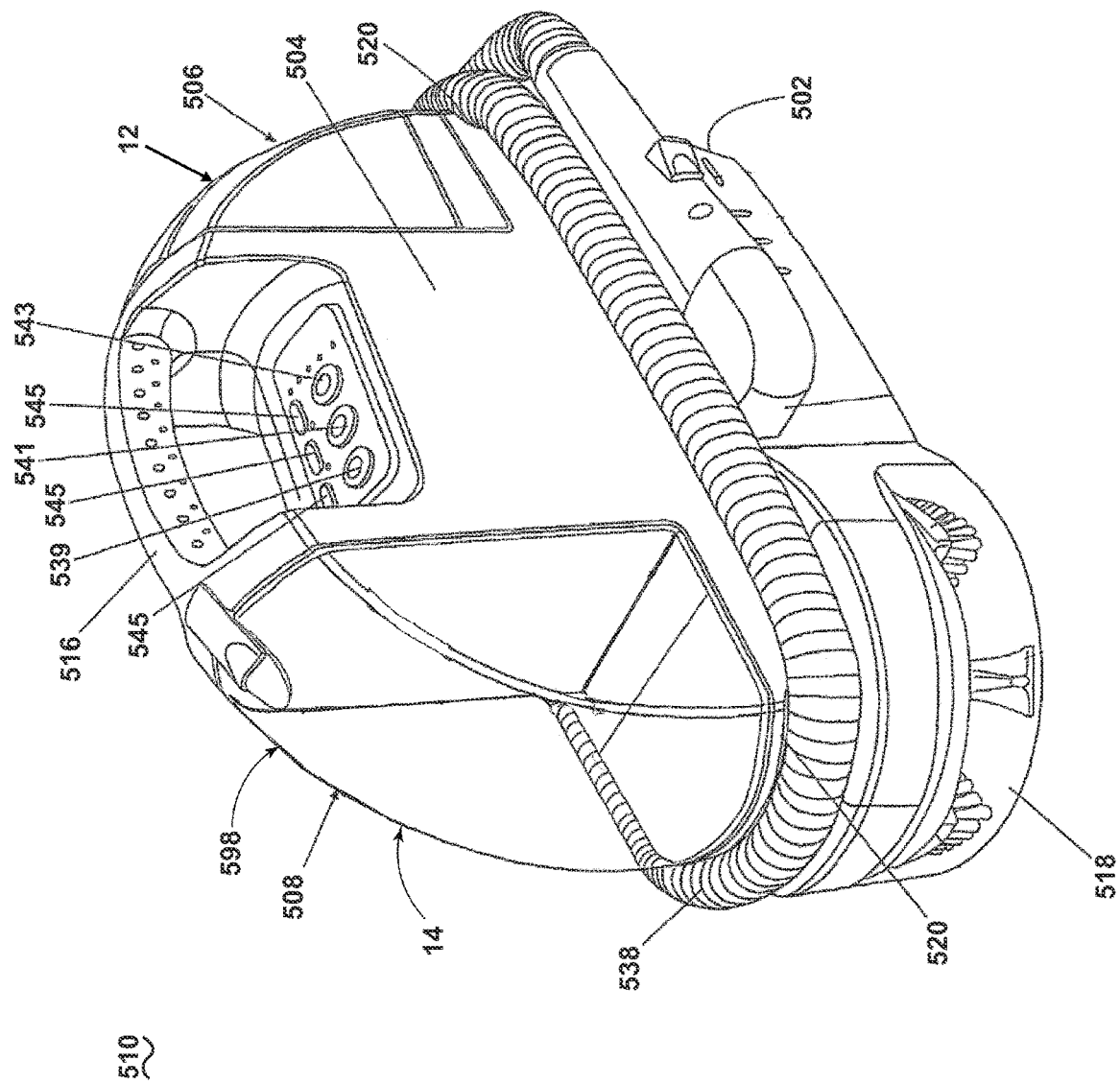
FIG. 10 is a perspective view of a surface cleaning apparatus according to another aspect of the present disclosure.

FIG. 10 is a perspective view illustrating one non-limiting example of an extraction cleaner 510 that is also known as a spot cleaning apparatus. The extraction cleaner or spot cleaning apparatus 510 can be used for unattended or manual cleaning of spots and stains on carpeted surfaces and can be structurally and operably similar to U.S. Pat. No. 7,228,589 issued Jun. 12, 2007, which is incorporated herein by reference in its entirety. The extraction cleaner can include various systems and components schematically described for FIG. 1, including the liquid delivery system 12 for storing and delivering a cleaning fluid to the surface to be cleaned and the recovery system 14 for extracting and storing the dispensed cleaning fluid, dirt and debris from the surface to be cleaned. The extraction cleaner or spot cleaning apparatus 510 includes a bottom housing or portion 502, a top housing or portion 504, a clean tank assembly 506, a recovery tank assembly 508, a carriage assembly, a motor/fan assembly, and a pump assembly. The bottom housing 502 rests on a surface to be cleaned, and the top housing 504 and the bottom housing 502 mate to form a cavity therebetween. A handle 516 is integrally formed at an upper surface of the top housing 504 to facilitate easy carrying of the extraction cleaner or spot cleaning apparatus 510. Optionally, below the handle 516, are various switches 539, 541, and 543 to control operation of the extraction cleaner 510. Additionally, one or more indicator lights 545 can be located adjacent to the switches 539, 541, and 543.

A carriage assembly lens 518 is attached to a forward lower section of the bottom housing 502 to define an opening in the underside of the bottom housing 502 and is preferably made from a transparent material for visibility of the carriage assembly located behind the carriage assembly lens 518. Hose recesses 520 are integrally formed in a lower surface of the top housing 504 in forward and rearward locations that can hold a flexible hose 538. The recovery tank assembly 508 can includes a fluid level sensing assembly 598, the details of which are not shown herein, coupled to a controller (not shown). Similarly to the fluid level sensing assembly 98 from FIG. 4, the fluid level sensing assembly 598 can include at least one probe with at least one conductor wherein the fluid level sensing assembly 598 can detect a liquid or a foam level in the recovery tank assembly 508. The fluid level sensing assembly 598 can complete one or more methods 200, 200a, 200b, by taking measurements to determine critical fluid level, liquid level, or foam level and acting on the determination.

Figure 11:
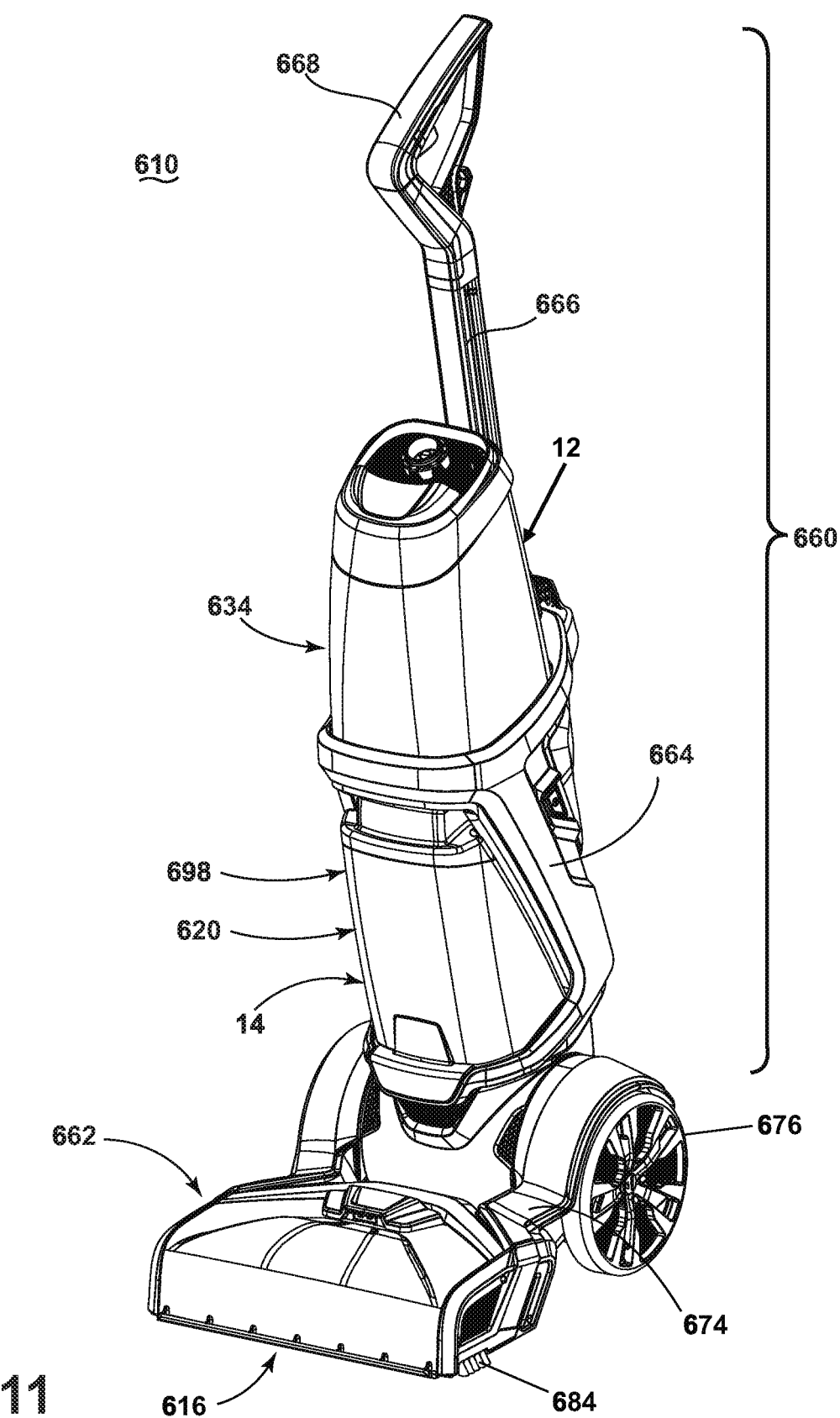
FIG. 11 is a perspective view of a surface cleaning apparatus according to yet another aspect of the present disclosure.

FIG. 11 is a perspective view illustrating one non-limiting example of an extraction cleaner 610, according to yet another aspect of the present disclosure. As illustrated herein, the extraction cleaner 610 is an upright extraction cleaner having a housing that includes an upright assembly 660 that is pivotally connected to a base assembly 662 for directing the base assembly 662 across the surface to be cleaned. The extraction cleaner 610 can include the various systems and components schematically described for FIG. 1, including the liquid delivery system 12 for storing and delivering a cleaning fluid to the surface to be cleaned and the recovery system 14 for extracting and storing the dispensed cleaning fluid, dirt and debris from the surface to be cleaned. The various systems and components schematically described for FIG. 1, including the liquid delivery system 12 and fluid recovery system 14 can be supported by either or both the base assembly 662 and the upright assembly 660.

The upright assembly 660 includes a main support section or frame 664 supporting components of the liquid delivery system 12 and the recovery system 14, including, but not limited to, the recovery container 620 and the fluid supply container 634. The recovery container 620 and the fluid supply container 634 function in the same way as the recovery container 20 and the first container 34 from FIG. 1. Additional details of a suitable recovery container for the extraction cleaner 610, which can include an air/liquid separator assembly (not shown) are disclosed in U.S. Patent Application Publication No. 2017/0071434, published Mar. 16, 2017, which is incorporated herein by reference in its entirety. The upright assembly 660 also has an elongated handle 666 extending upwardly from the frame 664 that is provided with a hand grip 668 at one end that can be used for maneuvering the extraction cleaner 610 over a surface to be cleaned. The frame 664 of the upright assembly 660 can include container receivers for respectively receiving the recovery and supply containers 620, 634 for support on the upright assembly 660. A motor housing is formed at a lower end of the frame 664 and contains the motor/fan assembly positioned therein in fluid communication with the recovery container 620. Additional details of suitable container receivers and motor housing are disclosed in U.S. Patent Application Publication No. 2017/0071434, incorporated above.

The extraction cleaner 610 can also include a base housing 674 that can include, but is not limited to, wheels 676, a suction nozzle 616, and one or more agitators 684.

The recovery container 620 of the extraction cleaner 610 can include a fluid level sensing assembly 698, the details of which are not shown herein, connected to a controller (not shown). Similarly to the fluid level sensing assembly 98 from FIG. 4, the fluid level sensing assembly 698 can include at least one probe with at least one conductor wherein the fluid level sensing assembly 698 can detect a liquid or a foam level in the recovery container 620. The fluid level sensing assembly 698 can complete one or more methods 200, 200a, 200b, by taking measurements to determine critical fluid level, liquid level, or foam level and acting on the determination.

Figure 12:
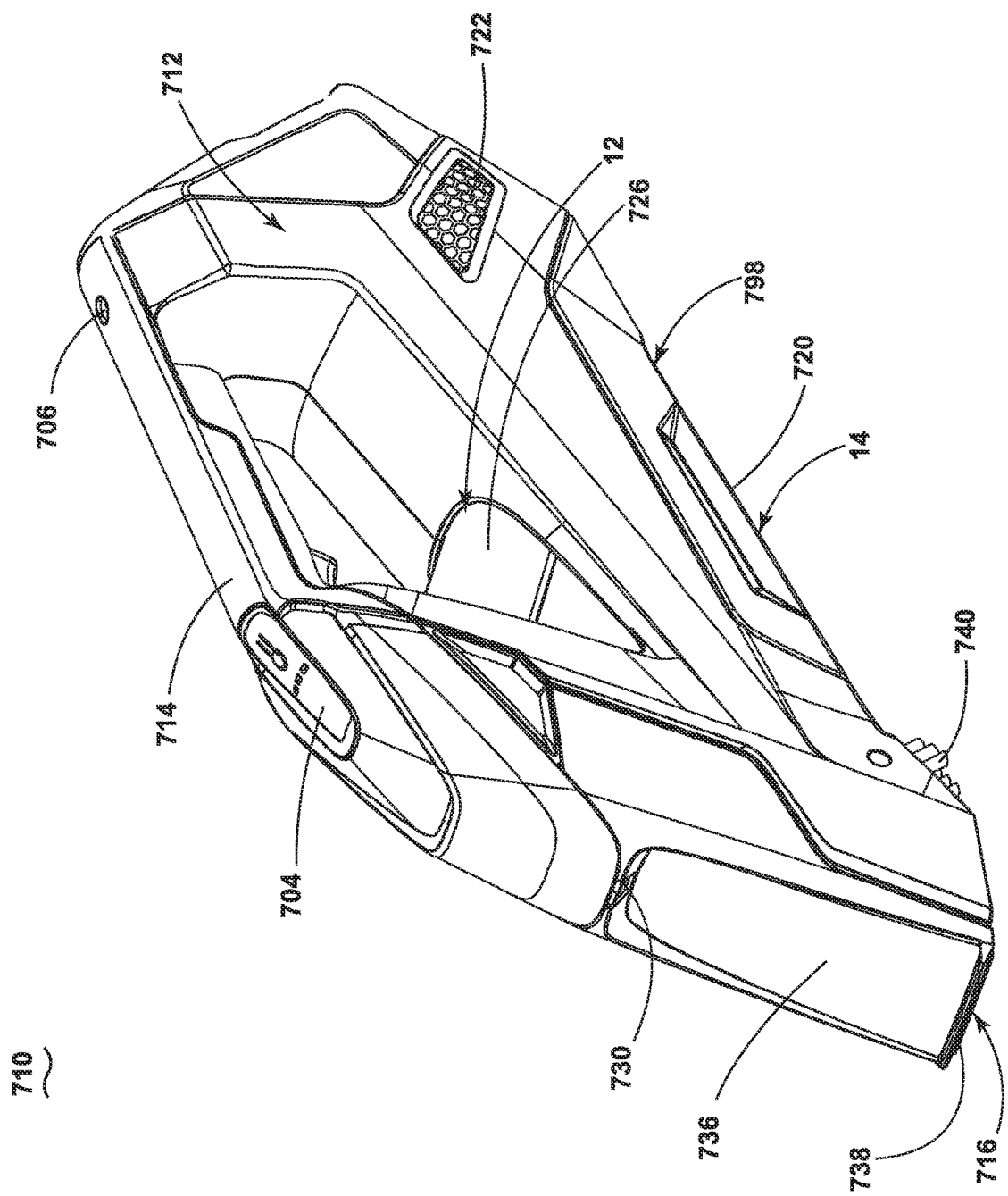
FIG. 12 is a perspective view of a surface cleaning apparatus according to still yet another aspect of the present disclosure.

FIG. 12 is a perspective view illustrating one non-limiting example of an extraction cleaner 710, according to still yet another aspect of the present disclosure. FIG. 12 is a perspective view of a handheld extraction cleaner 710. As illustrated herein, the extraction cleaner 710 is adapted to be handheld and portable, and can be easily carried or conveyed by hand. The hand-carriable extraction cleaner 710 can have a unitary body 712 provided with a carry handle 714 attached to the unitary body 712, and is small enough to be transported by one user (i.e. one person) to the area to be cleaned. The carry handle 714 can include a power switch 704 or a charging port 706.

The handheld extraction cleaner 710 includes a unitary body 712 or housing that carries the various functional systems of the extraction cleaner 710. The extraction cleaner 710 can include the various systems and components schematically described for FIG. 1, including the liquid delivery system 12 for storing and delivering a cleaning fluid to the surface to be cleaned and the recovery system 14 for extracting and storing the dispensed cleaning fluid, dirt and debris from the surface to be cleaned. The various systems and components schematically described for FIG. 1, including the liquid delivery system 12 and fluid recovery system 14 can be supported by either or both a supply tank 726 to deliver cleaning fluid to a surface to be cleaned through a fluid outlet 730 or a working fluid path through the unitary body 712.

The recovery system includes the working fluid path through the unitary body 712. The working fluid path can be formed by, among other elements, a suction nozzle 738 defining the fluid inlet 716, a suction source in fluid communication with the suction nozzle 738 for generating a working air stream, a recovery container 720 for separating and collecting fluid and debris for later disposal, and exhaust vents 722. The suction nozzle 738 can also include a cover 736. An agitator 740 can be adjacent to or couple to the suction nozzle 738.

The recovery system can further include a separator for separating fluid and entrained debris from the fluid path. The separated fluid and debris can be collected in the recovery container 720. One example of a suitable separator is disclosed in U.S. Pat. No. 7,225,503, issued Jun. 5, 2007, which is incorporated herein by reference in its entirety. Other examples of suitable separators are disclosed in U.S. Pat. No. 6,189,178, issued Feb. 20, 2001, and U.S. Pat. No. 6,968,593, issued Nov. 29, 2005, both of which are incorporated herein by reference in their entirety.

Further the extraction cleaner 710 can be structurally and operably similar to the extraction cleaner of U.S. Patent Application Publication No. 2018/0116476, published May 3, 2018, which is incorporated herein by reference in its entirety.

The recovery container 720 of the extraction cleaner 710 can include a fluid level sensing assembly 798, the details of which are not shown herein, connected to a controller (not shown). Similarly to the fluid level sensing assembly 98 from FIG. 4, the fluid level sensing assembly 798 can include at least one probe with at least one conductor wherein the fluid level sensing assembly 798 can detect a liquid or a foam level in the recovery container 720. The fluid level sensing assembly 798 can complete one or more methods 200, 200a, 200b, by taking measurements to determine critical fluid level, liquid level, or foam level and acting on the determination.

Figure 13:
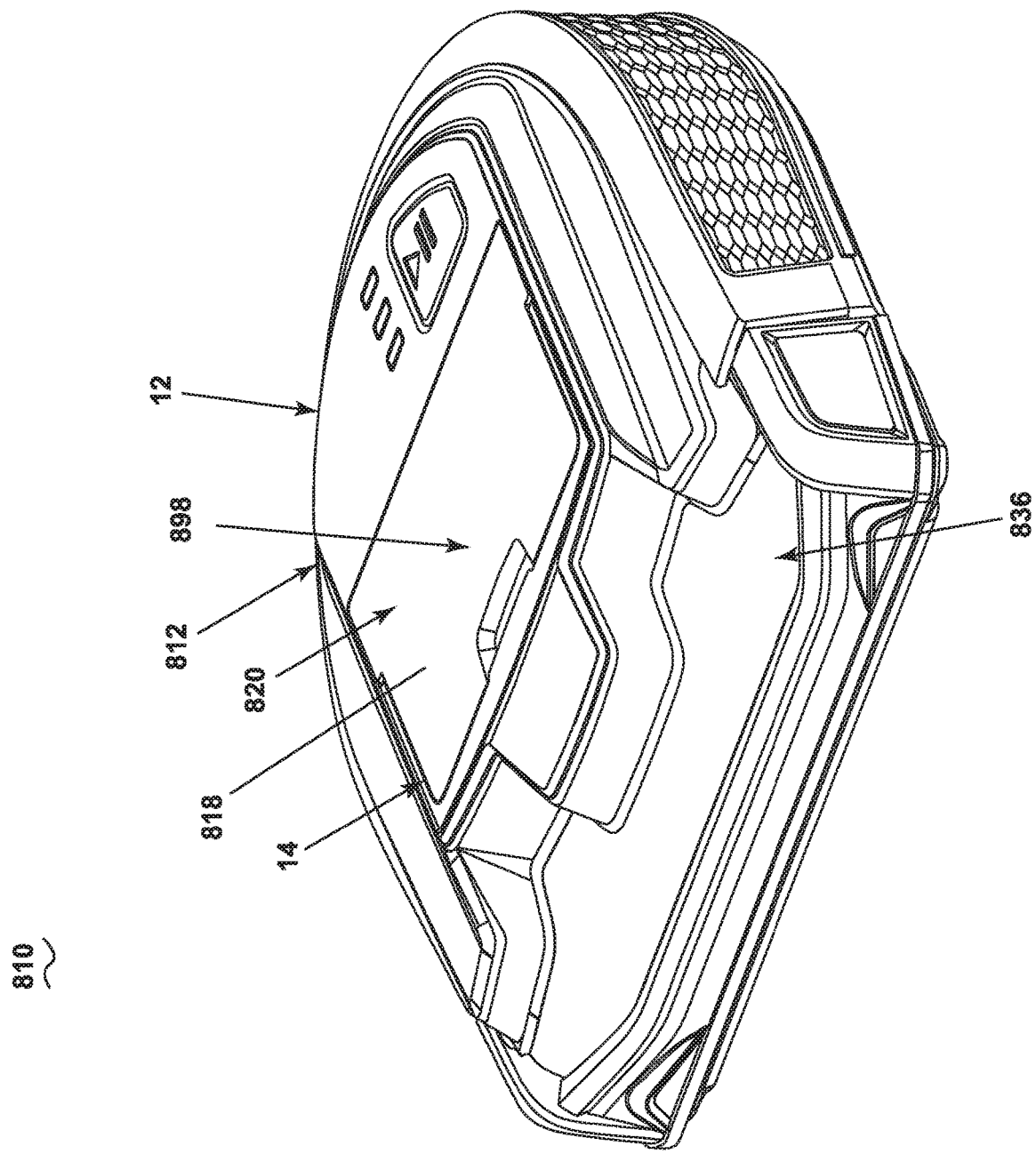
FIG. 13 is a perspective view of a surface cleaning apparatus according to further yet another aspect of the present disclosure.

FIG. 13 is a perspective view illustrating one non-limiting example of an extraction cleaner or autonomous vacuum cleaner 810, according to further yet another aspect of the present disclosure. The autonomous vacuum cleaner 810 has been illustrated as a robotic vacuum cleaner that mounts the components various functional systems of the vacuum cleaner in an autonomously moveable unit or housing 812, including components of a vacuum collection system for generating a working air flow for removing dirt (including dust, hair, and other debris) from the surface to be cleaned and storing the dirt in a collection space on the vacuum cleaner, and a drive system for autonomously moving the vacuum cleaner over the surface to be cleaned. The autonomous vacuum cleaner 810 can be structurally and operably similar to the autonomous vacuum cleaner of U.S. Application Publication No. 2018/0078106 published Mar. 22, 2018 which is incorporated herein by reference in entirety. The autonomous vacuum cleaner 810 can include a brush chamber 836 at a front of the autonomous unit 812 in which an agitator can be mounted.

The autonomous vacuum cleaner 810 includes a vacuum collection system can include a working air path through the unit having an air inlet and an air outlet, a suction nozzle, a suction source in fluid communication with the suction nozzle for generating a working air stream, and a dirt bin 818 for collecting dirt from the working airstream for later disposal. The suction nozzle can define the air inlet of the working air path. The suction source can be a motor/fan assembly carried by the unit 812, fluidly upstream of the air outlet, and can define a portion of the working air path. The dirt bin 818 can also define a portion of the working air path, and include a dirt bin inlet in fluid communication with the air inlet. A separator can be formed in a portion of the dirt bin 818 for separating fluid and entrained dirt from the working airstream. Some non-limiting examples of the separator include a cyclone separator, a filter screen, a foam filter, a HEPA filter, a filter bag, or combinations thereof.

It is contemplated that the autonomous vacuum cleaner 810 can be configured to be an autonomous extraction cleaner that includes various systems and components schematically described for FIG. 1, including the liquid delivery system 12 for storing and delivering a cleaning fluid to the surface to be cleaned and the recovery system 14 for extracting and storing the dispensed cleaning fluid, dirt and debris from the surface to be cleaned. It is further contemplated that integrating a fluid supply system to the autonomous vacuum cleaner 810 could result in the addition of a supply tank (not shown) to unit 812 and a recovery container 820 that can be located, as a non-limiting example, in the dirt bin 818.

The recovery container 820 can include a fluid level sensing assembly 898, the details of which are not shown herein, connected to a controller (not shown). Similarly to the fluid level sensing assembly 98 from FIG. 4, the fluid level sensing assembly 898 can include at least one probe with at least one conductor wherein the fluid level sensing assembly 898 can detect a liquid or a foam level in the recovery container 820. The fluid level sensing assembly 898 can complete one or more methods 200, 200a, 200b, by taking measurements to determine critical fluid level, liquid level, or foam level and acting on the determination.

FIG. 14 is an exploded perspective view of another recovery tank assembly 974, which can be utilized in the extraction cleaner 10 or a cleaning apparatus as described above. The recovery tank assembly 974 is similar to the recovery tank assembly 74; therefore, like parts will be identified with like numerals increased by 900, with it being understood that the description of the like parts of the recovery tank assembly 74 will apply to the recovery tank assembly 974, except where noted.

As with the previous assembly, the recovery tank assembly 974 includes, a pleated filter 984, filter cover plate 986, and mesh screen 988 at the air outlet 987 that can be located atop a lid 982 and the recovery container 20 creates a seal therebetween for prevention of leaks.

A releasable latch 1100 is optionally provided on the lid 982 to facilitate removal of the recovery tank assembly 974 for emptying or cleaning. The releasable latch 1100 can be configured to releasably lock the recovery tank assembly 974 to the upright body, such that a user must actuate the releasable latch 1100 before pulling the recovery tank assembly 974 off the frame 66. The hand grip 110 can be provided on the recovery container 920 and located below the latch 1100 to facilitate handling of the recovery tank assembly 974.

Another difference is that a removable strainer 1150 is included and configured to strain large debris and hair out of the recovery container 920 prior to emptying. The removable strainer 1150 is configured to collect the large debris and hair while draining fluid (e.g. liquid) and smaller debris back into the recovery container 920. One example of a suitable strainer is disclosed in U.S. patent application Ser. No. 15/827,790, filed Nov. 30, 2017, which is incorporated herein by reference in its entirety. For purposes of this description, large debris are any debris with a maximum dimension, such as a length or diameter, of greater than or equal to 0.5 mm to 6 mm, and preferably 3 mm, whereas small debris are any debris having a maximum dimension, such as a length or diameter, of less than that of the larger debris. An example of a piece of large debris includes a strand of hair with a length greater than 3 mm. Examples of small debris include coffee grounds and crumbs with diameters less than 3 mm.

The removable strainer 1150 can includes an elongated handle or grip 1152 and a base 1154. The removable strainer 1150 can be removably mounted within the recovery container 920 such that the base 1154 is at a bottom end of the recovery container 920 and the grip 1152 extends toward a top end of the tank container 258 (FIG. 15). The base 1154 can include a plurality of drain holes 1156 for draining fluid when the removable strainer 1150 is removed from the recovery container 920, and optionally a raised rim 1158 around its perimeter for containing debris. An opening 1160 can also be provided in the base 1154 for accommodating a standpipe 923 (FIG. 15). The base 1154 can form a cup-shaped colander that retains large debris and hair.

The drain holes 1156 can be circular or non-circular openings or apertures in the base 1154. In one example, the size of the drain holes 1156 can range in diameter from 0.5 mm to 6 mm, and optionally from 3 mm to 4 mm. Other examples of drain holes 1156 are possible, including the removable strainer 1150 having a grid or mesh on the base 1154 defining the drain holes 1156.

As better illustrated in FIG. 15, a collection chamber 921 is formed by the recovery container 920 for the fluid recovery system and includes a hollow standpipe 923 therein. The standpipe 923 can be oriented such that it is generally coincident with a longitudinal axis of the recovery container 920. The standpipe 923 forms a flow path between a tank inlet 925 formed at a lower end of the recovery container 920 and a tank outlet 927 at the upper end of the standpipe 923 within the interior of the recovery container 920. When the recovery tank assembly 974 is mounted to the frame 66, the tank inlet 925 is aligned with the pivotable swivel joint assembly and conduit therein to establish fluid communication between the base 14 and the recovery tank assembly 974. The standpipe 923 can be integrally formed with the tank container 258.

The base 1154 can be configured to fit within the recovery container 920 at a location spaced from a bottom wall 925 thereof. When the removable strainer 1150 is inserted into the recovery container 920, fluid and small debris can pass through the drain holes 1156 to the area of the collection chamber 921 below the base 1154, while large debris and hair is trapped above the base 1154. Optionally, a stop 927 can be provided on the standpipe 923 that limits the insertion of the removable strainer 1150 into the recovery container 920 to maintain the base 1154 spaced above the bottom wall 292.

As shown, the grip 1152 can extends upwardly and/or vertically along the inner surface of the recovery container 920 and can be oriented such that it is generally parallel to the longitudinal axis of the recovery container 920, and optionally also to the standpipe 923. The strainer 1150 shown herein is further inserted and removed from the recovery container 920 along a direction that is parallel to, or coincident with, the longitudinal axis of the recovery container 920. The base 1154 extends from a lower end of the grip 1152 to substantially cover the bottom wall 925 of the recovery container 920, such that any large debris/hair is trapped by the base 1154 above the bottom wall 925. The grip 1152 can be offset and relatively slender to maximize space available in the recovery container 920 for collecting debris and fluid.

In typical recovery tanks, large debris and hair is not strained out and is disposed of together with the fluid waste (e.g. liquid waste), which can potentially result in clogged drains and pipes. Alternatively, large debris and hair can be manually picked out of the recovery tank, which is unsanitary and laborious. With the removable strainer 1150, a user can simply remove the lid 982 and lift the removable strainer 1150 out. The removable strainer 1150 separates out large debris and hair while fluid and smaller debris drains back into the recovery container 920. The long grip 1152 prevents a user from contact with any of the collected debris or fluid. Thus, a user can easily and sanitarily dispose of any large debris and hair in the trash, prior to emptying the fluid waste down a sink, toilet, or other drain thereby avoiding the problems with prior recovery tanks. The removable strainer 1150 can be particularly helpful for use with a multi-surface vacuum cleaner because these types of vacuum cleaners ingest wet and dry debris, including large dry debris, and deposit the debris mixture into a single recovery tank.

A shut-off valve 1163 (FIG. 16) can be provided for interrupting suction when liquid or foam in the recovery container 920 reaches a predetermined level. The shut-off valve can be positioned in any suitable manner and include any suitable type of valve. The fluid level sensing assembly 998 can be configured to determine when such shut-off valve should be activated. The fluid level sensing assembly 998 can include any suitable assembly for sensing one of at least liquid or foam at one or more levels within the recovery container 920 or other portions of the extraction cleaner 10. In the illustrated example, at least one side bracket assembly 992a, 992b is fixedly attached to the lid 982 in a position offset from the standpipe 923. Further still, at least one front bracket assembly 92c is attached to the lid 82 adjacent an air outlet 96.

Figure 16:
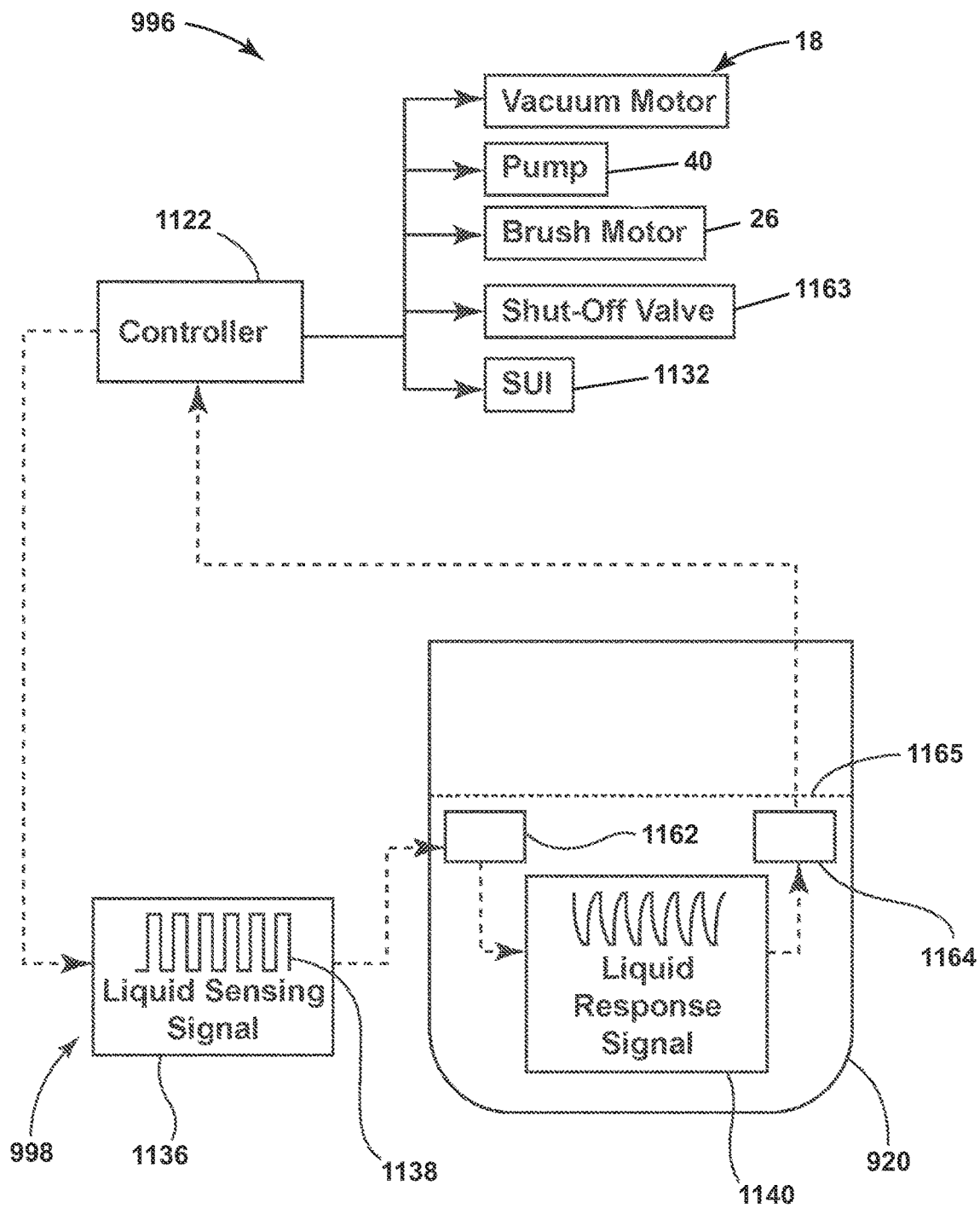
FIG. 16 is a schematic view of a sensing system utilized with the recovery tank assembly of FIG. 14.

FIG. 16 is a schematic view of the sensing system 996. The probes or sensors 1162, 1164 are coupled with a controller 1122. The controller 1122 can also be operationally connected to other components of the apparatus 10, as described in further detail below. The first sensor 1162 can emit a liquid sensing signal 1136 from the controller 1122 at a given frequency 1138. The liquid sensing signal 1136 travels through contents of the recovery container 920 to form a liquid response signal 1140 that is detected by the second sensor 1164 and communicated to the controller 1122. The second sensor 1164 can be located in the recovery container 920 at a critical liquid level 1165. The term critical liquid level is used herein to define a level or location where, if liquid is present, at least one electrical component of the apparatus 10 is shut down to prevent liquid ingress into the suction source 18. If the liquid response signal 1140 indicates that the liquid in the recovery container 920 is at or above the critical level 1165, the controller 1122 can turn off the at least one electrical component of the apparatus 10. Such components can include the suction source 18 itself, and more particularly the vacuum motor, and optionally also the pump 40 and/or the brush motor for the agitator 26. As illustrated, the controller 1122 can additionally or alternatively activate a shut-off valve 1163 in response to the liquid response signal 1140 to prevent liquid ingress into the suction source 18. The shut-off valve 1163 can be provided for interrupting suction when liquid in the recovery container 920 reaches the critical level 1165.

Additionally or alternatively, the controller 1122 based on the liquid response signal 1140 can provide a visual or audible status indication such as a light or sound via the user interface or SUI 1132. The visual or audible status indication can alert the user that the liquid is too high in the recovery tank or that a component of the apparatus 1210 has been turned off. It is also contemplated that the controller 1122 can detect a presence or an absence of the recovery container 920 with the inclusion of a resistor with high resistance (not shown) coupled between the first sensor 1162 and the second sensor 1164 and that such presence or absence can be indicated on the user interface 1132.

Figure 17:
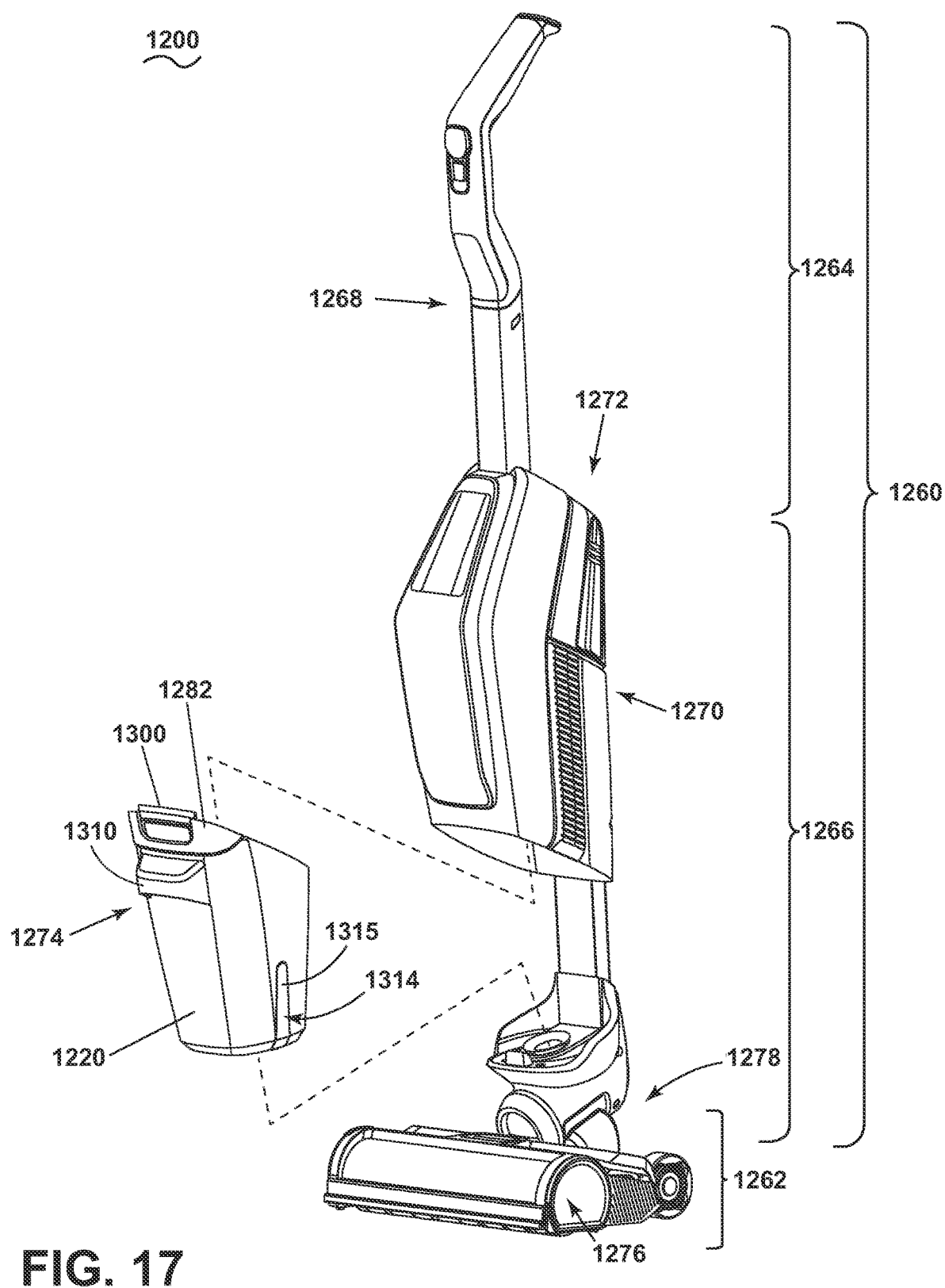
FIG. 17 is a perspective view of a surface cleaning apparatus according to an aspect of the present disclosure having a recovery tank assembly exploded therefrom.

Another aspect of the disclosure includes a cleaning apparatus or extraction cleaner 1210 with a conductivity sensing system 1296 is shown in FIG. 17. The extraction cleaner 1210 is similar to the extraction cleaner 10 therefore, like parts will be identified with like numerals increased by 1200, with it being understood that the description of the like parts of the extraction cleaner 10 will apply to the extraction cleaner 1210, except where noted. Further still, the extraction cleaner 1200 includes a sensing system similar to the sensing system 996 it will be understood that the description of the like parts will apply to the sensing system, except where noted. One difference is that the two sensors or probes instead of being suspended within the recovery container 1220 are located within the exterior sidewalls of the recovery container 1220.

Figure 18:
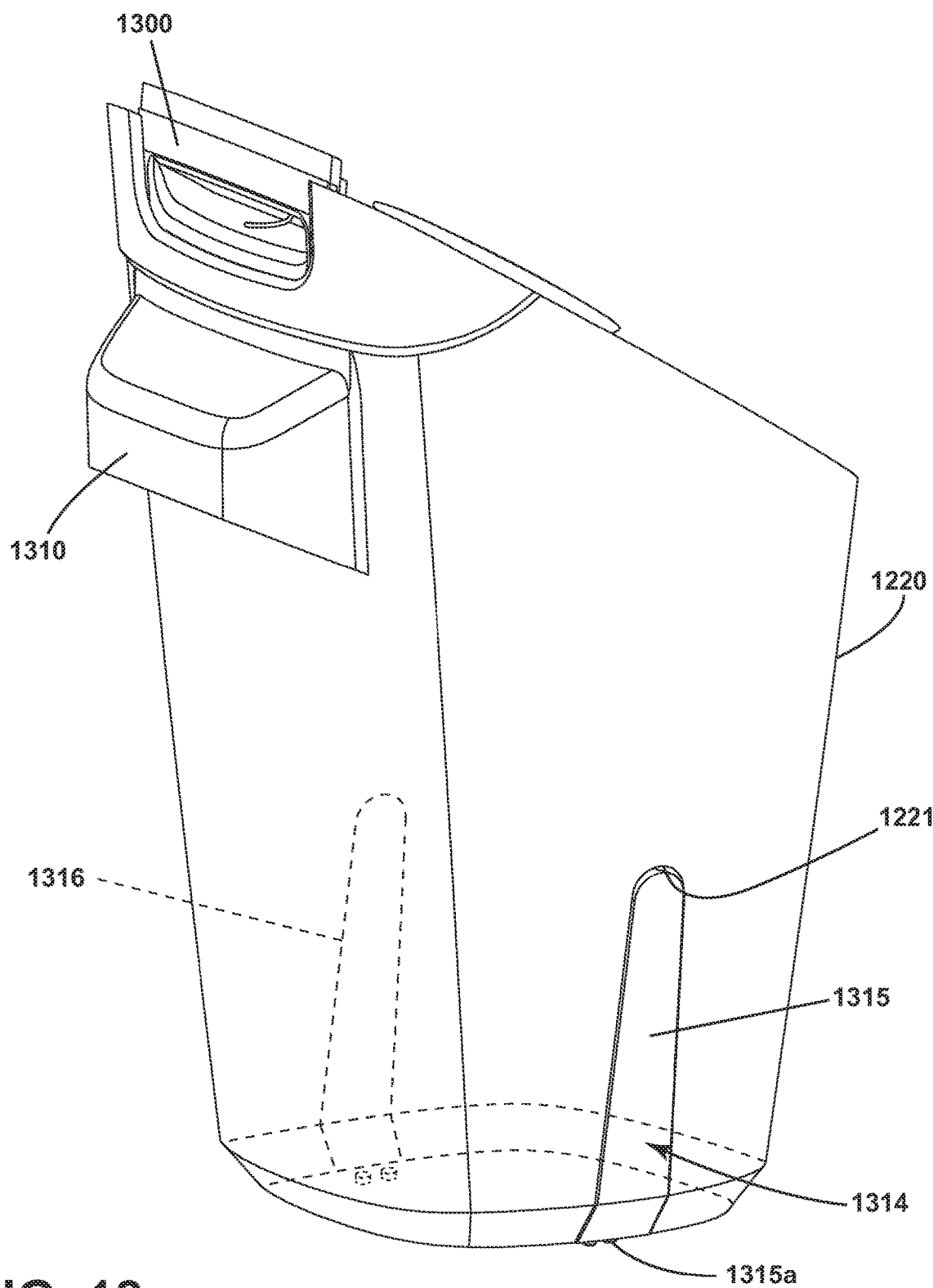
FIG. 18 is a side perspective view of the recovery tank assembly of FIG. 17.
Figure 19:
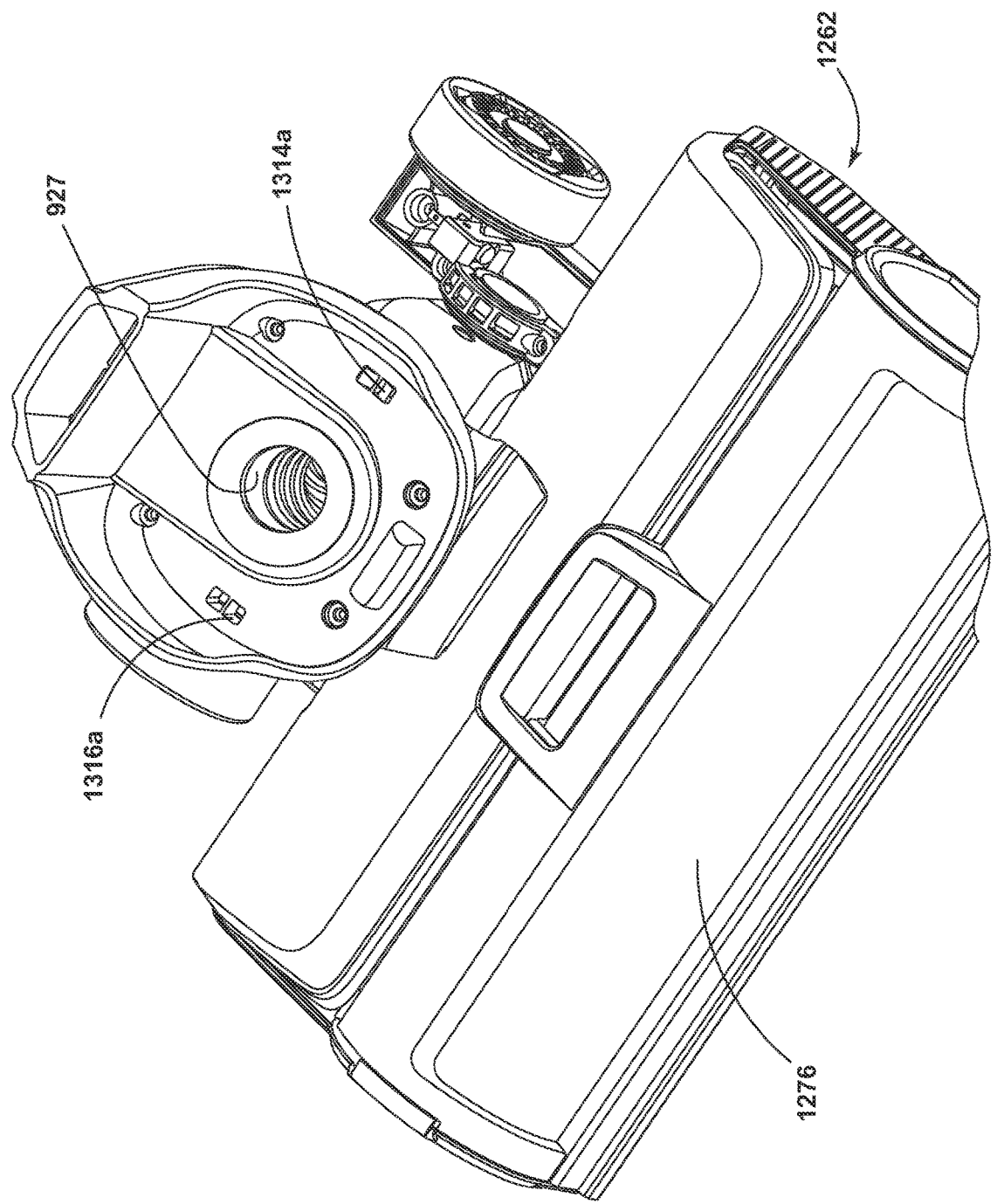
FIG. 19 is a top perspective view of a base of the extraction cleaner of FIG. 17

As illustrated more clearly in FIG. 18 the recovery container 1220 includes recesses 1221 formed into two opposing side walls of the recovery container 1220. A first sensor 1314 and a second sensor 1316 each include a set of pins insert-molded, generally illustrated at conductive pad 1315 into the recesses 1221 of the recovery container. The set of pins can include a generally vertical configuration and terminal ends 1315*a* of the set of pins can be received in corresponding electrical connectors 1314*a* and 1316*a* (FIG. 19) spaced about a conduit 927 located in the base 1276. The electrical connectors 1314*a* and 1316*a* can be operably coupled to a controller (not shown) for the extraction cleaner 1210. The first sensor 1314 and second sensor 1316 operate similarly to those within the sensing system 996 and coupled with the controller including that they are configured to conductively sense critical liquid levels and action can be taken based thereon including operation of at least one electrical component of the apparatus 1210 to shut down to prevent liquid ingress or alert a user via the user interface.

Figure 20:
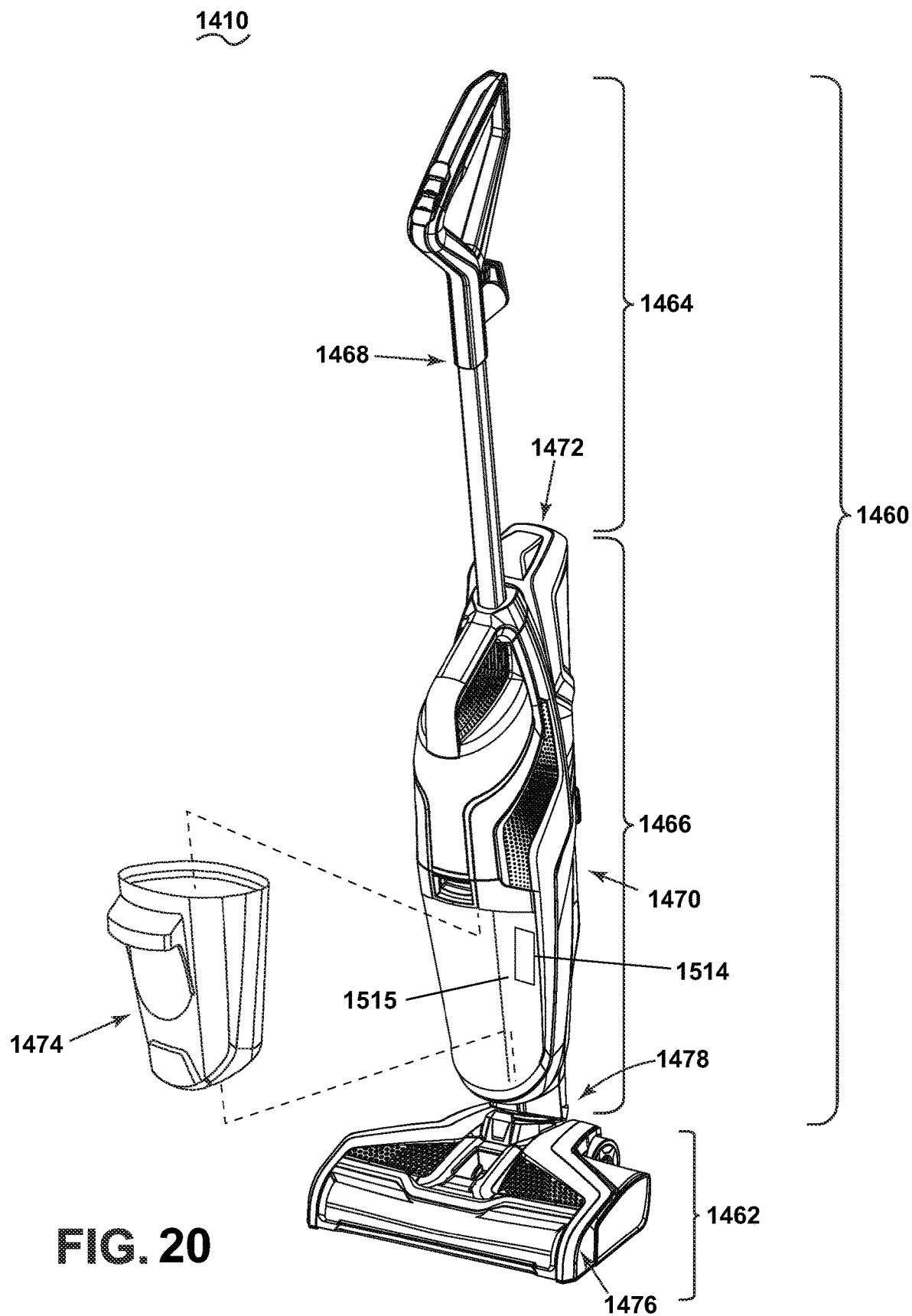
FIG. 20 is a perspective view of a surface cleaning apparatus according to an aspect of the present disclosure having a recovery tank assembly exploded therefrom.
Figure 21:
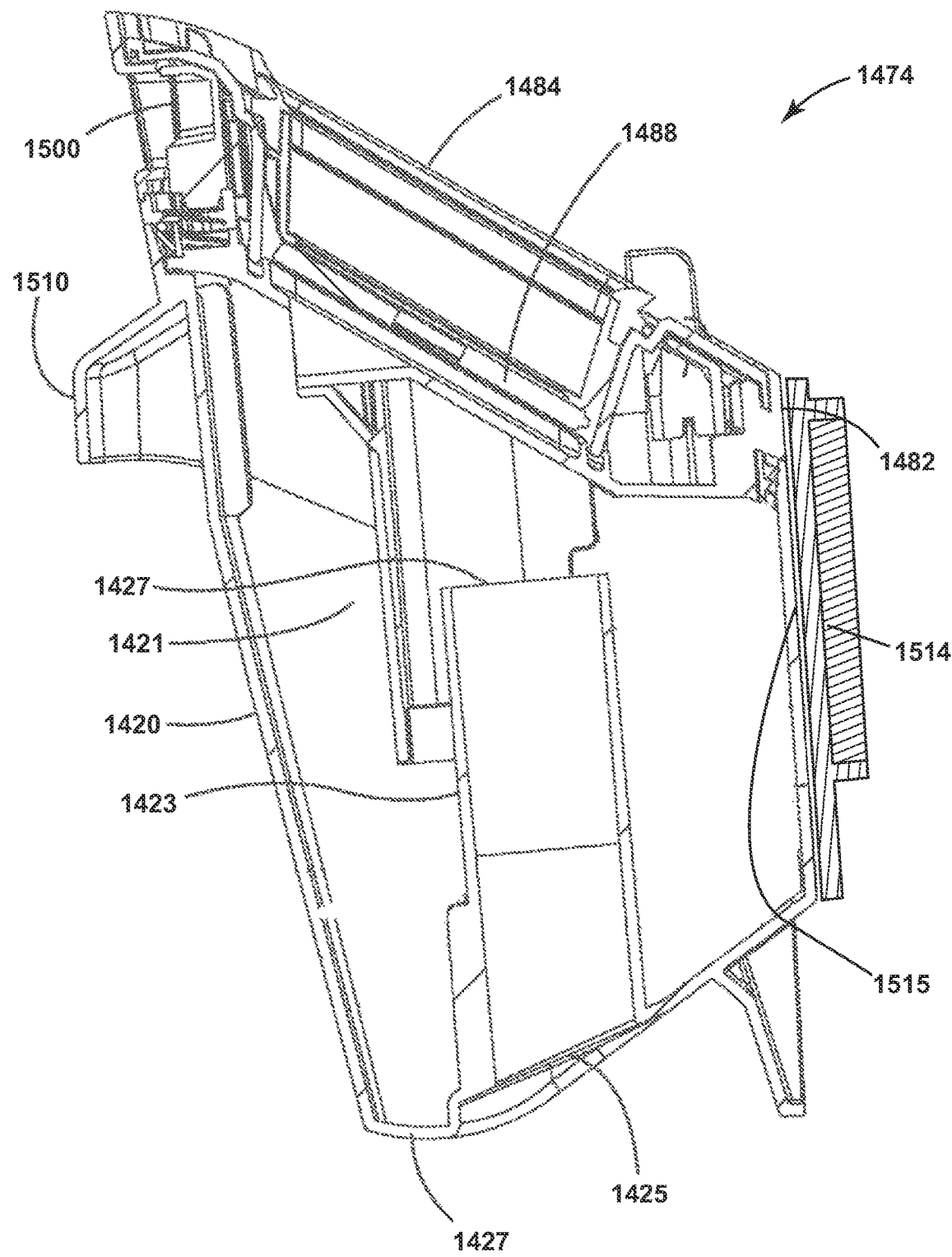
FIG. 21 is a cross-sectional view though the assembled recovery tank assembly of FIG. 20.

FIG. 20 illustrates another exemplary cleaning apparatus or extraction cleaner 1410, which is similar to the extraction cleaner 10 therefore, like parts will be identified with like numerals increased by 1400, with it being understood that the description of the like parts of the extraction cleaner 10 will apply to the extraction cleaner 1410, except where noted. One difference is that the recovery tank assembly 1474 does not include sensors suspended within the recovery container; instead, a sensor 1514 is attached to a wall 1515 of the frame 1466 of the upright handle assembly 1460 adjacent to where the recovery tank assembly 1474 is received in the body assembly 1470. FIG. 21 is a cross-sectional view though the assembled recovery tank assembly of FIG. 20 where it can be better illustrated that the recovery tank 1420 abuts against the wall 1515, which is only partially shown. A sensor assembly 1514 can be located adjacent the wall 1515. While the wall is illustrated as including brackets for holding the sensor assembly 1514 in place it will be understood that this is merely by way of non-limiting example and that any suitable mechanism can be utilized to place the sensor assembly 1514.

Unlike the sensing systems previously described the sensor assembly 1514 can include a self-capacitive sensing system where the probes 1517 (FIG. 22) are conductive pads mounted on the wall 1515 behind the recovery container 1420. It will be understood that the recovery container 1420 and sensor assembly 1514 can be abutting, adjacent, or spaced via air or the wall 1515 in any suitable configuration. Wall thickness of the recovery tank 1420 is generally below 3 mm and made of plastic materials. The wall thickness of the wall 1515 can vary and a small air gap can be located between walls.

Figure 22:
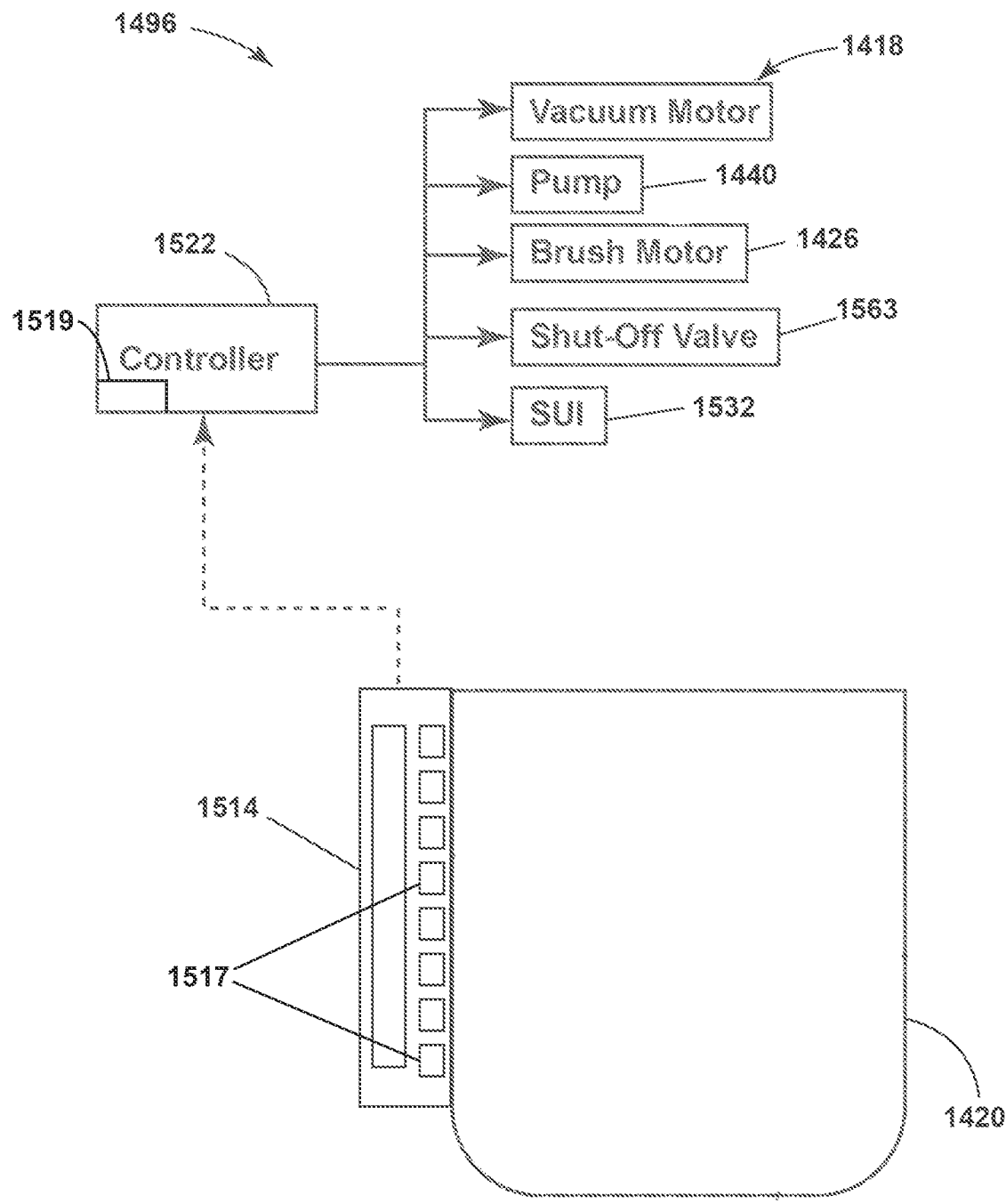
FIG. 22 is a schematic view of a sensing system utilized with the recovery tank assembly of FIG. 21.

As illustrated more clearly in FIG. 22 the probes 1517 can be placed along a height of the recovery container 1420 such that the sensor assembly 1514 is configured to sense or detect multiple liquid levels within the recovery container 1420 and can detect liquid levels based on orientation of the recovery tank 1420. The sensor assembly 1514 can be operably coupled to the controller 1522 to provide outputs thereto. Having the sensor assembly 1514 removed or separate from the recovery container 1420 can provide for additional robustness as compared to examples where the sensors are located within or on the recover container or lid.

Further still, an accelerometer 1519 can be included such that the sensing system 1496 can estimate the tank fill level or volume of liquid in the recovery container 1420 as the extraction cleaner 1410 is operated as the accelerometer provides an orientation of the recovery container 1420 and the capacitance sensing of the sensor assembly 1514 provides a fluid level for the given orientation of the recovery container 1420. The accelerometer 1519 has been illustrated as being located with the controller 1522 schematically in FIG. 22. It is contemplated that the accelerometer 1519 can be located on a printed circuit board (PCB) forming the controller 1522 or a portion of the controller 1522 and that such controller 1522 can be located in the upright handle assembly 1460 such that the recovery tank angle can be determined when the upright handle assembly 1460 is tilted during use.

During operation, the tilt of the recovery tank 1420 can be determined by the controller 1522 via input from the accelerometer 1519 and that information as well as the liquid level sensing from the self-capacitive sensor assembly 1514 can be utilized by the controller 1522 to determine a liquid level within the recovery tank 1420. In this manner, the controller 1522 can determine that at high liquid levels detected via the sensor assembly 1514 and at a high tilt from vertical as determined utilizing the accelerometer 1519, a critical liquid level has not been reached. This can prevent triggering of a false critical liquid level determination and abate unnecessary action by the extraction cleaner 10 as a result. However, when it is determined based on information from the accelerometer 1519 and the sensor assembly 1514 that a critical liquid level is present, the controller 1522 can take appropriate action. For example, the controller 1522 can turn off at least one electrical component of the apparatus 1410 including the suction source 1418 itself, and more particularly the vacuum motor, as well as the pump 1440 and/or the brush motor for the agitator 1426. As illustrated, the controller 1522 can additionally or alternatively activate a shut-off valve 1563 or can provide a visual or audible status indication such as a light or sound via the user interface 1532.

It will be understood that regardless of the particular sensing system utilized that all aspects of the disclosure allow for level sensing in one or more tanks or containers of the apparatus including while the apparatus is in use or moving. The aspects of the disclosure remove or otherwise do not include mechanical float(s) in the fluid tank(s), in this manner the sensing system can be considered to be floatless. This in turn provides for an improved cleanout experience of the recovery tank as no mechanical floats are present to retain or trap debris that must be cleaned to prevent float malfunction and undesirable odors.

In determining that a floatless or electronic sensing system would be beneficial various other considerations and problems have been considered including sloshing of liquid or foam within the containers based on movement of the cleaning apparatus including translation and articulation of the cleaning apparatus during operation. Aspects of the disclosure including the exemplary sensing systems allow for the tanks to maintain full detection performance while operating. This includes sensing levels in the tank regardless of debris therein, including for example when wet hair bridges the sensor probes. Typical fluid level electronic sensing applications with a static tank, such as an industrial chemical mixer or a tank that does not include debris such as a vehicle gas tanks would not include such considerations and therefore are not applicable to cleaning apparatuses.

Any of the above sensing systems can be utilized to determine a level of liquid within the container or tank. As described above, sensing systems disclosed herein include, by way of non-limiting examples, include a high frequency fluid and foam sensor including one example having three probes: one for transmitting and two receiving probes including one for fluid and one for foam sensing and another example includes two probes with one transmitting probe and one receiving probe configured for fluid sensing. According to a method of operating, a non-DC signal or an AC driving signal can be utilized. Such an AC driving signal can include, by way of non-limiting examples a high frequency square wave, a low frequency pulse width modulation (PWM) signal, etc. Further still, the method of operating can include injecting a non-DC signal(s) into the container or tank. Benefits of the method include that data can be collected faster than the rate of sloshing, which allows the sensing system to observe snapshots of the water level within the container. A controller of the sensing system can condition the signal such as through thresholding, averaging, etc. to figure out the actual fluid level. It will be understood that the frequency of the injected non-DC signal can be selected based on factors like the geometry of the tank. Alternatively or additionally the frequency of the injected non-DC signal can be selected based on properties of water or foam including permittivity or ability to hold electric energy, conductivity, etc. Taking these factors into consideration, the frequency can be selected to increase detectability or better delineate between water and foam if the apparatus detects both.

Optionally, any of the sensing systems can include electronic components to capacitively couple and smooth the response signals such that the rise time or the average amplitude of the voltage of the received signals can be determined. Further, any of the respective controllers can be configured to perform one or more signal processing algorithms on the received response signals to determine one or more characteristics of the received response signal. Signal processing algorithms incorporated into the controller for assisting in the determination of one or more characteristics of the received signals can include, but are not limited to, blind source separation, principal component analysis, singular value decomposition, wavelet analysis, independent component analysis, cluster analysis, Bayesian classification, etc. It is contemplated that any of the sensors of the sensing system can be configured to transmit, receive or transmit and receive one or more sensing signals. The sensing signals can include any waveform useful in sensing liquid, including, but not limited to, square waves, sine waves, triangle waves, sawtooth waves, and combinations thereof. Furthermore, the sensing signals can include any frequency useful in sensing liquid, including, but not limited to, frequencies ranging from approximately 10 kilohertz to 10 megahertz. In one non-limiting example, the liquid sensing signals can be multiplexed and transmitted simultaneously to one or more sensors.

The slew rate of the operational amplifier, which is the time it takes to respond to a change in voltage, is critical for high frequency operation within the above described cleaning apparatuses. The slew rate helps identify the maximum input frequency and amplitude applicable to the amplifier such that the output is not significantly distorted. It has been determined that a slew rate of approximately 15 V/us can be beneficial and that a performance drop-off was detected at a slew rate of 1 V/us and below.

One advantage that can be realized according to aspects of the present disclosure is that the recovery container that requires occasional removal for emptying, is easier to reattach to the extraction cleaner due to the absence of additional liquid measuring components, such as a float. Another advantage is that frequency measurements can be utilized allowing for the accurate detection of liquid and foam. Frequency measurements enable the extraction cleaner to distinguish between liquid and foam and accurately detect the respective levels of each. The features, alone or in combination, create a superior indication system for extraction cleaners. Another benefit that can be achieved is that levels of fluid or foam can be sensed and a user can be alerted or portions of the apparatus shut off, including valving, so that overflow does not occur.

To the extent not already described, the features and structures of the various aspects of the present disclosure of the extraction cleaners, systems, and methods may be used in combination with each other as desired. That one feature may not be illustrated in all of the embodiments is not meant to be construed that it cannot be, but is done for brevity of description. Thus, the various features of the embodiments disclosed herein may be mixed and matched as desired to form new embodiments, whether or not the new embodiments are expressly described. Furthermore, while the extraction cleaners shown herein are upright or robot cleaners, features of the disclosure may alternatively be applied to canister-type, stick-type, handheld, or portable extraction cleaners.

It is intended that the following claims define the scope of the invention and that the method(s) and/or apparatus within the scope of these claims and their equivalents be covered thereby. This description of the invention should be understood to include all novel and non-obvious combinations of elements described herein, and claims may be presented in this or a later application to any novel and non-obvious combination of these elements. Any aspect of any embodiment can be combined any aspect of any of the other embodiments. Moreover, the foregoing embodiments are illustrative, and no single feature or element is essential to all possible combinations that may be claimed in this or a later application. For example, various characteristics, aspects, and advantages of the present invention may also be embodied in the following technical solutions defined by the following clauses and may include any combination of the following concepts:

A surface cleaning device, including:
a base adapted for contacting a surface of a surrounding environment to be cleaned; a suction source;
a suction nozzle assembly provided on the base and defining a suction nozzle in fluid communication with the suction source;
a fluid delivery and recovery system, comprising:
a fluid supply tank adapted to hold a supply of fluid;
a fluid dispenser in fluid communication with the fluid supply tank; and
a recovery tank in fluid communication with the suction nozzle;
a fluid level sensing assembly, comprising:
at least one probe; and
a controller communicatively coupled to the at least one probe and configured to electronically control the at least one probe and configured to detect a level of fluid in at least one of the fluid supply tank or the recovery tank to define a presence of liquid.

The surface cleaning device of any of the disclosed aspects wherein the controller is further configured to determine an operational status of the fluid delivery system based on the detected fluid level.

The surface cleaning device of any of the disclosed aspects wherein the fluid level sensing assembly further comprises an accelerometer communicatively coupled to the controller and outputting a signal to the controller.

The surface cleaning device of any of the disclosed aspects wherein the controller is further configured to estimate a volume of liquid within the recovery tank based on the signal from the accelerometer.

The surface cleaning device of any of the disclosed aspects wherein the controller is further configured to detect a presence of foam in at least one of the fluid supply tank or the recovery tank.

The surface cleaning device of any of the disclosed aspects wherein detecting the presence of liquid or detecting the presence of foam, the controller is further configured to at least one of de-energize a component or provide an alert.

The surface cleaning device of any of the disclosed aspects wherein the at least one probe is located on a bracket assembly that is contained within the recovery tank.

The surface cleaning device of any of the disclosed aspects wherein the bracket assembly is operably coupled to a lid of the recovery tank.

The surface cleaning device of any of the disclosed aspects wherein the at least one probe is disposed within a side wall of the recovery tank.

The surface cleaning device of any of the disclosed aspects wherein the surface cleaning device is one of an upright vacuum cleaner, a multi-surface floor cleaner, a robotic vacuum, a canister vacuum, a portable deep cleaner, an upright deep cleaner, or a commercial extractor.

The surface cleaning device of any of the disclosed aspects wherein the controller is further configured to detect a presence of the recovery tank based on a signal from the at least one probe.

The surface cleaning device of any of the disclosed aspects wherein the at least one probe comprises a first probe configured to emit a liquid sensing signal at a first frequency and a second probe configured to detect a liquid response signal.

The surface cleaning device of any of the disclosed aspects wherein the first frequency is greater than 10 kilohertz.

The surface cleaning device of any of the disclosed aspects wherein the first frequency is greater than 100 kilohertz.

The surface cleaning device of any of the disclosed aspects wherein the liquid sensing signal is one of a square wave, a sine wave, a triangle wave, or a sawtooth wave.

The surface cleaning device of any of the disclosed aspects wherein the first probe is further configured to emit a foam sensing signal at a second frequency.

The surface cleaning device of any of the disclosed aspects wherein the second frequency is greater than 40 kilohertz.

The surface cleaning device of any of the disclosed aspects wherein the second frequency is greater than 10 kilohertz.

The surface cleaning device of any of the disclosed aspects wherein the at least one probe further comprises a third probe configured to detect a foam response signal.

The surface cleaning device of any of the disclosed aspects wherein the third probe is positioned above the second probe.

The surface cleaning device of any of the disclosed aspects wherein the controller is operationally connected to at least one of the suction source, a pump, an agitator, or a user interface.

The surface cleaning device of any of the disclosed aspects wherein the controller is further configured to deenergize the at least one of the suction source, the pump, the agitator, or the user interface based on the liquid response signal detected at the second probe.

The surface cleaning device of any of the disclosed aspects wherein the controller is further configured to deenergize at least one component of the suction source upon detection of foam based on a signal detected at the third probe.

The surface cleaning device of any of the disclosed aspects wherein the fluid level sensing assembly further comprises at least one component electrically coupled between the at least one probe and the controller and configured to output an average voltage representative of the liquid response signal.

The surface cleaning device of any of the disclosed aspects wherein the fluid level sensing assembly further comprises at least one component electrically coupled between the at least one probe and the controller and configured to output an average voltage representative of the foam response signal.

The surface cleaning device of any of the disclosed aspects wherein the fluid level sensing assembly further comprises at least one component electrically coupled between the at least one probe and the controller and configured to output a signal representative of the average rise time of the foam response signal.

The surface cleaning device of any of the disclosed aspects wherein the fluid level sensing assembly further comprises at least one component electrically coupled between the at least one probe and the controller and configured to output an average voltage representative of the liquid response signal.

The surface cleaning device of any of the disclosed aspects wherein the fluid level sensing assembly further comprises at least one component electrically coupled between the at least one probe and the controller and configured to output a signal representative of the average rise time of the liquid response signal.

The surface cleaning device of any of the disclosed aspects wherein the fluid level sensing assembly further comprises at least one component configured to capacitively couple the at least one probe to the controller.

The surface cleaning device of any of the disclosed aspects wherein the controller further comprises an operational amplifier with a slew rate greater than 1 volt per microsecond.

The surface cleaning device of any of the disclosed aspects wherein the controller is further configured to respond to a signal that changes at a rate greater than 1 volt per microsecond.

The surface cleaning device of any of the disclosed aspects wherein the at least one probe is configured to emit a liquid sensing signal at a first frequency and to emit a foam sensing signal at a second frequency.

The surface cleaning device of any of the disclosed aspects wherein the at least one probe is configured to concurrently emit the liquid sensing signal and the foam sensing signal.

The surface cleaning device of any of the disclosed aspects wherein the at least one probe is configured to consecutively emit the liquid sensing signal and the foam sensing signal.

The surface cleaning device of any of the disclosed aspects wherein the liquid sensing signal is one a square wave.

A sensing system for a cleaning apparatus, the sensing system comprising a sensor assembly including at least one electrical sensor configured to output a first signal indicative of a liquid level within a tank of the cleaning apparatus and a controller communicatively coupled to the at least one sensor and configured to electronically control the at least one sensor and configured to detect a level of fluid in the tank to define a presence of liquid.

The sensing assembly of any of the disclosed aspects further comprising an accelerometer communicatively coupled to the controller and outputting a second signal indicative of a tilt angle of the tank.

The sensing assembly of any of the disclosed aspects wherein the controller is further configured to estimate a volume of liquid within the recovery tank based on the first signal from the at least one sensor and the second signal from the accelerometer.

The sensing assembly of any of the disclosed aspects wherein the at least one electrical sensor includes a self-capacitive sensor having a plurality of probes and wherein the first signal indicates one of a plurality of liquid levels within the tank.

The sensing assembly of any of the disclosed aspects wherein the accelerometer is located on a printed circuit board of the controller.

A method for operating a cleaning apparatus, the method comprising: operating a recovery system of the cleaning apparatus wherein a suction nozzle in fluid communication with a suction source is fluidly coupled to a recovery tank, outputting a signal from at least one electrical sensor related to the recovery tank; and determining, via a controller, from the signal a level of fluid in the tank.

Any of the disclosed aspects further comprising outputting a second signal from an accelerometer communicatively coupled to the controller.

Any of the disclosed aspects wherein the controller is further configured to estimate a volume of liquid within the recovery tank based on the second signal from the accelerometer.

Any of the disclosed aspects further comprising de-energizing, via the controller, a component of the cleaning apparatus or provide an alert via a user interface.

Any of the disclosed aspects wherein the at least one electrical sensor is located on a bracket assembly that is contained within the recovery tank.

Any of the disclosed aspects wherein the bracket assembly is operably coupled to a lid of the recovery tank.

Any of the disclosed aspects wherein the at least one electrical sensor is disposed within a side wall of the recovery tank.

Any of the disclosed aspects wherein the surface cleaning device is one of an upright vacuum cleaner, a multi-surface floor cleaner, a robotic vacuum, a canister vacuum, a portable deep cleaner, an upright deep cleaner, or a commercial extractor.

Any of the disclosed aspects further comprising detecting a presence of the recovery tank based on the signal.

While the aspects of the present disclosure have been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A surface cleaning device, comprising:
    a base adapted for contacting a surface of a surrounding environment to be cleaned;
    a suction source;
    a suction nozzle assembly provided on the base and defining a suction nozzle in fluid communication with the suction source;
    a fluid delivery and recovery system, comprising:
        a fluid supply tank adapted to hold a supply of fluid;
        a fluid dispenser in fluid communication with the fluid supply tank; and
        a recovery container in fluid communication with the suction nozzle assembly;
    a body assembly configured to receive the recovery container; and
    a sensor assembly provided with the body assembly and located adjacent to the recovery container, wherein the sensor assembly includes a self-capacitive sensing system having a plurality of probes and the plurality of probes are conductive pads mounted adjacent the recovery container; and
    wherein the plurality of probes are located along a height of the recovery container such that the sensor assembly is configured to sense or detect multiple liquid levels within the recovery container.

2. The surface cleaning device of claim 1, wherein the recovery container includes a wall thickness below 3 millimeters.

3. The surface cleaning device of claim 1, wherein the body assembly includes a wall abutting the sensor assembly.

4. The surface cleaning device of claim 3, wherein the wall includes brackets for holding the sensor assembly.

5. The surface cleaning device of claim 1, wherein the surface cleaning device is one of an upright vacuum cleaner, a multi-surface floor cleaner, a robotic vacuum, a canister vacuum, a portable deep cleaner, an upright deep cleaner, or a commercial extractor.

6. The surface cleaning device of claim 5, wherein
a controller is operationally connected to at least one of the suction source, a pump, an agitator, or a user interface, and
the controller is configured to deenergize the at least one of the suction source, the pump, the agitator, or the user interface based on input from the sensor assembly.

7. The surface cleaning device of claim 1, comprising a controller in communication with the sensor assembly, wherein the sensor assembly provides input to the controller.

8. The surface cleaning device of claim 7, wherein the controller determines a liquid level based on the input from the sensor assembly.

9. The surface cleaning device of claim 8, comprising an accelerometer communicatively coupled to the controller, wherein the accelerometer provides an input to the controller.

10. The surface cleaning device of claim 1, wherein the recovery container is removably mounted to the body assembly.

11. The surface cleaning device of claim 10, comprising a controller configured to detect a presence or an absence of the recovery container via input from the sensing assembly.

12. The surface cleaning device of claim 11, comprising a user interface in communication with the controller, wherein the controller is configured to indicate via the user interface the presence or the absence of the recovery container.

13. A surface cleaning device, comprising:
a base adapted for contacting a surface of a surrounding environment to be cleaned;
a suction source;
a suction nozzle assembly provided on the base and defining a suction nozzle in fluid communication with the suction source;
a fluid delivery and recovery system, comprising:
a fluid supply tank adapted to hold a supply of fluid;
a fluid dispenser in fluid communication with the fluid supply tank; and
a recovery container in fluid communication with the suction nozzle assembly;
a body assembly configured to receive the recovery container;
a sensor assembly provided with the body assembly and located adjacent to the recovery container;
a controller in communication with the sensor assembly, wherein the sensor assembly provides input to the controller; and
an accelerometer communicatively coupled to the controller, wherein the accelerometer provides an input to the controller;
wherein the controller determines a liquid level based on the input from the sensor assembly; and
wherein tilt of the recovery container is determined by the controller in communication with the accelerometer.

14. The surface cleaning device of claim 13, wherein the recovery container includes a wall thickness below 3 millimeters.

15. A surface cleaning device, comprising:
a base adapted for contacting a surface of a surrounding environment to be cleaned;
a suction source;
a suction nozzle assembly provided on the base and defining a suction nozzle in fluid communication with the suction source;
a fluid delivery and recovery system, comprising:
a fluid supply tank adapted to hold a supply of fluid;
a fluid dispenser in fluid communication with the fluid supply tank; and
a recovery container in fluid communication with the suction nozzle assembly;
a body assembly configured to receive the recovery container;
a sensor assembly provided with the body assembly and located adjacent to the recovery container;
a controller in communication with the sensor assembly, wherein the sensor assembly provides input to the controller; and
an accelerometer communicatively coupled to the controller, wherein the accelerometer provides an input to the controller;
wherein the controller determines a liquid level based on the input from the sensor assembly; and
wherein the controller determines a liquid level based on the input from the accelerometer and the input from the sensor assembly.

16. The surface cleaning device of claim 15, wherein the sensor assembly includes a self-capacitive sensing system having a plurality of probes.

17. The surface cleaning device of claim 15, wherein the recovery container includes a wall thickness below 3 millimeters.

18. The surface cleaning device of claim 15, wherein the accelerometer is located on a printed circuit board of the controller.

19. The surface cleaning device of claim 18, wherein the controller is further configured to provide a visual or audible status indication via a user interface based on the determined liquid level.

20. A surface cleaning device, comprising:
a base adapted for contacting a surface of a surrounding environment to be cleaned;
a suction source;
a suction nozzle assembly provided on the base and defining a suction nozzle in fluid communication with the suction source;
a fluid delivery and recovery system, comprising:
a fluid supply tank adapted to hold a supply of fluid;
a fluid dispenser in fluid communication with the fluid supply tank; and
a recovery container in fluid communication with the suction nozzle assembly;
a body assembly configured to receive the recovery container; and
a sensor assembly provided with the body assembly and located adjacent to the recovery container;
wherein the recovery container includes a wall thickness below 3 millimeters.

* * * * *